US012561375B2

(12) United States Patent　　　　(10) Patent No.:　US 12,561,375 B2
Bathwal et al.　　　　　　　　　　　 (45) Date of Patent:　　　Feb. 24, 2026

(54) ENHANCED SEARCH RESULT GENERATION USING MULTI-DOCUMENT SUMMARIZATION

(71) Applicant: Snowflake Inc., Bozeman, MT (US)

(72) Inventors: Rahil Bathwal, San Francisco, CA (US); Daniel Fernando Campos, Hudson, NY (US); Ashwin Devaraj, Menlo Park, CA (US); Seth Michael Li, Foster City, CA (US); Muhua Ngan, San Mateo, CA (US); Vivek Raghunathan, Palo Alto, CA (US); Sridhar Ramaswamy, Cupertino, CA (US); Rajhans Samdani, Belmont, CA (US); Chiu Wah So, Saratoga, CA (US); Nitya Kannan Tarakad, Belmont, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/443,838

(22) Filed: Feb. 16, 2024

(65) Prior Publication Data

US 2024/0281487 A1　　Aug. 22, 2024

Related U.S. Application Data

(60) Provisional application No. 63/446,750, filed on Feb. 17, 2023.

(51) Int. Cl.
　　*G06F 16/9032*　　(2019.01)
　　*G06F 16/2457*　　(2019.01)
　　　　　　(Continued)

(52) U.S. Cl.
　　CPC .. *G06F 16/90328* (2019.01); *G06F 16/24575* (2019.01); *G06F 16/248* (2019.01);
　　　　　　(Continued)

(58) Field of Classification Search
　　CPC ............... G06F 16/90328; G06F 16/93; G06F 16/9558; G06F 16/24575; G06F 16/9538; G06F 16/248
　　See application file for complete search history.

(56) References Cited

U.S. PATENT DOCUMENTS 7,765,225 B2　　7/2010　Robert
12,061,961 B2　　8/2024　Fuerst et al.
　　　　　　(Continued)

OTHER PUBLICATIONS

"U.S. Appl. No. 18/444,078, Preliminary Amendment filed May 21, 2024", 3 pages.

(Continued)

*Primary Examiner* — Van H Oberly
*Assistant Examiner* — Brooks T Hale
(74) *Attorney, Agent, or Firm* — Schwegman Lundberg & Woessner, P.A.

(57)　　　　　　ABSTRACT

Enhanced search results are generated using multi-document summarization. A multi-document summarization system receives a search query from a user and retrieves a plurality of search result documents based on the search query. The summarization system generates a summary of each of the plurality of search result documents using distinct per-document summarization machine learning models, where the distinct per-document summarization machine learning models are trained on a training dataset. The summarization system synthesizes the summary of each of the plurality of search result documents into a single-consolidated answer responsive to the received search query. The multi-document summarization system formats the single-consolidated answer to include citations to the plurality of search result documents.

24 Claims, 10 Drawing Sheets

(51) Int. Cl.

| | |
|---|---|
| *G06F 16/248* | (2019.01) |
| *G06F 16/93* | (2019.01) |
| *G06F 16/9538* | (2019.01) |
| *G06F 16/955* | (2019.01) |

(52) U.S. Cl.
CPC .......... *G06F 16/93* (2019.01); *G06F 16/9538* (2019.01); *G06F 16/9558* (2019.01)

(56) References Cited

U.S. PATENT DOCUMENTS

| | | | |
|---|---|---|---|
| 12,159,694 B2 | 12/2024 | Nie et al. | |
| 2006/0041597 A1* | 2/2006 | Conrad ................... | G06F 16/30 |
| 2008/0313147 A1* | 12/2008 | Svore ................. | G06F 16/3331 |
| 2014/0100863 A1* | 4/2014 | Mantz ................... | G06Q 10/10 |
| | | | 705/2 |
| 2014/0195506 A1 | 7/2014 | Perlegos | |
| 2015/0088921 A1 | 3/2015 | Somaiya et al. | |
| 2016/0335693 A1 | 11/2016 | Lin et al. | |
| 2016/0371340 A1 | 12/2016 | Waltermann et al. | |
| 2017/0039281 A1 | 2/2017 | Venkata et al. | |
| 2017/0118308 A1 | 4/2017 | Vigeant et al. | |
| 2018/0024994 A1 | 1/2018 | Sarikaya | |
| 2018/0089572 A1 | 3/2018 | Aili et al. | |
| 2018/0307727 A1 | 10/2018 | Lucas et al. | |
| 2018/0314689 A1 | 11/2018 | Wang et al. | |
| 2019/0180195 A1 | 6/2019 | Terry et al. | |
| 2019/0205950 A1* | 7/2019 | Balasubramanian ........................ | |
| | | | G06Q 30/0623 |
| 2020/0012673 A1 | 1/2020 | Rudzicz et al. | |
| 2020/0104415 A1 | 4/2020 | Satti et al. | |
| 2020/0117658 A1 | 4/2020 | Venkata et al. | |
| 2020/0175076 A1 | 6/2020 | Powers et al. | |
| 2020/0341976 A1 | 10/2020 | Aggarwal et al. | |
| 2020/0349634 A1 | 11/2020 | Ghamsari et al. | |
| 2021/0004379 A1 | 1/2021 | Lee et al. | |
| 2021/0182350 A1 | 6/2021 | Gottumukkala et al. | |
| 2021/0191925 A1 | 6/2021 | Sianez | |
| 2021/0271823 A1 | 9/2021 | De Ridder | |
| 2021/0295822 A1* | 9/2021 | Tomkins ............. | G06F 16/3338 |
| 2022/0100746 A1 | 3/2022 | Chen et al. | |
| 2022/0147876 A1 | 5/2022 | Dalli et al. | |
| 2022/0198136 A1 | 6/2022 | Peleg et al. | |
| 2022/0245209 A1 | 8/2022 | Cho et al. | |
| 2022/0270594 A1 | 8/2022 | Sejpal et al. | |
| 2022/0293102 A1 | 9/2022 | Lee et al. | |
| 2022/0374608 A1 | 11/2022 | Shazeer et al. | |
| 2022/0374723 A1 | 11/2022 | Blukis et al. | |
| 2023/0004601 A1 | 1/2023 | Rajan et al. | |
| 2023/0079879 A1 | 3/2023 | Gunasekara et al. | |
| 2023/0145208 A1 | 5/2023 | Bobu et al. | |
| 2023/0192126 A1 | 6/2023 | Kumavat et al. | |
| 2023/0245651 A1 | 8/2023 | Wang | |
| 2023/0360388 A1 | 11/2023 | Singh | |
| 2023/0385085 A1 | 11/2023 | Singh | |
| 2024/0020538 A1 | 1/2024 | Socher et al. | |
| 2024/0031367 A1 | 1/2024 | Pringle | |
| 2024/0104391 A1 | 3/2024 | Higgins et al. | |
| 2024/0160902 A1 | 5/2024 | Padgett et al. | |
| 2024/0161017 A1 | 5/2024 | Pisner | |
| 2024/0202202 A1 | 6/2024 | Yudin et al. | |
| 2024/0256618 A1 | 8/2024 | Adada et al. | |
| 2024/0256622 A1 | 8/2024 | Abrams et al. | |
| 2024/0256762 A1 | 8/2024 | Beauchamp | |
| 2024/0256764 A1 | 8/2024 | Maschmeyer et al. | |
| 2024/0256965 A1 | 8/2024 | Chung et al. | |
| 2024/0265205 A1 | 8/2024 | Goligorsky | |
| 2024/0281446 A1 | 8/2024 | Bathwal et al. | |
| 2024/0281472 A1 | 8/2024 | Larhette et al. | |
| 2025/0217418 A1 | 7/2025 | Bathwal et al. | |

OTHER PUBLICATIONS

"U.S. Appl. No. 18/443,903, Preliminary Amendment filed May 21, 2024", 3 pages.

"U.S. Appl. No. 18/443,903, Examiner Interview Summary mailed Dec. 13, 2024", 2 pgs.

"U.S. Appl. No. 18/443,903, Non Final Office Action mailed Oct. 25, 2024", 14 pgs.

"U.S. Appl. No. 18/443,903, Response filed Jan. 27, 2025 to Non Final Office Action mailed Oct. 25, 2024", 18 pgs.

"U.S. Appl. No. 18/444,078, Notice of Allowance mailed Feb. 11, 2025", 20 pgs.

"U.S. Appl. No. 18/443,903, Examiner Interview Summary mailed Aug. 26, 2025", 2 pgs.

"U.S. Appl. No. 18/443,903, Final Office Action mailed Jun. 6, 2025", 15 pgs.

* cited by examiner

502

RETRIEVAL-AUGMENTED GENERATION SYSTEM

508    RESULTS COMPONENT

510    PHASE 1:
PER-DOCUMENT SUMMARIZATION COMPONENT

512    PHASE 1:
QUESTION-ANSWERING MODELS COMPONENT

514    PHASE 2:
CROSS-DOCUMENT CITATION COMPONENT

516    PHASE 2:
CROSS-DOCUMENT ATTRIBUTED
SUMMARIZATION COMPONENT

518    UNIFIED GENAI ANSWER COMPONENT

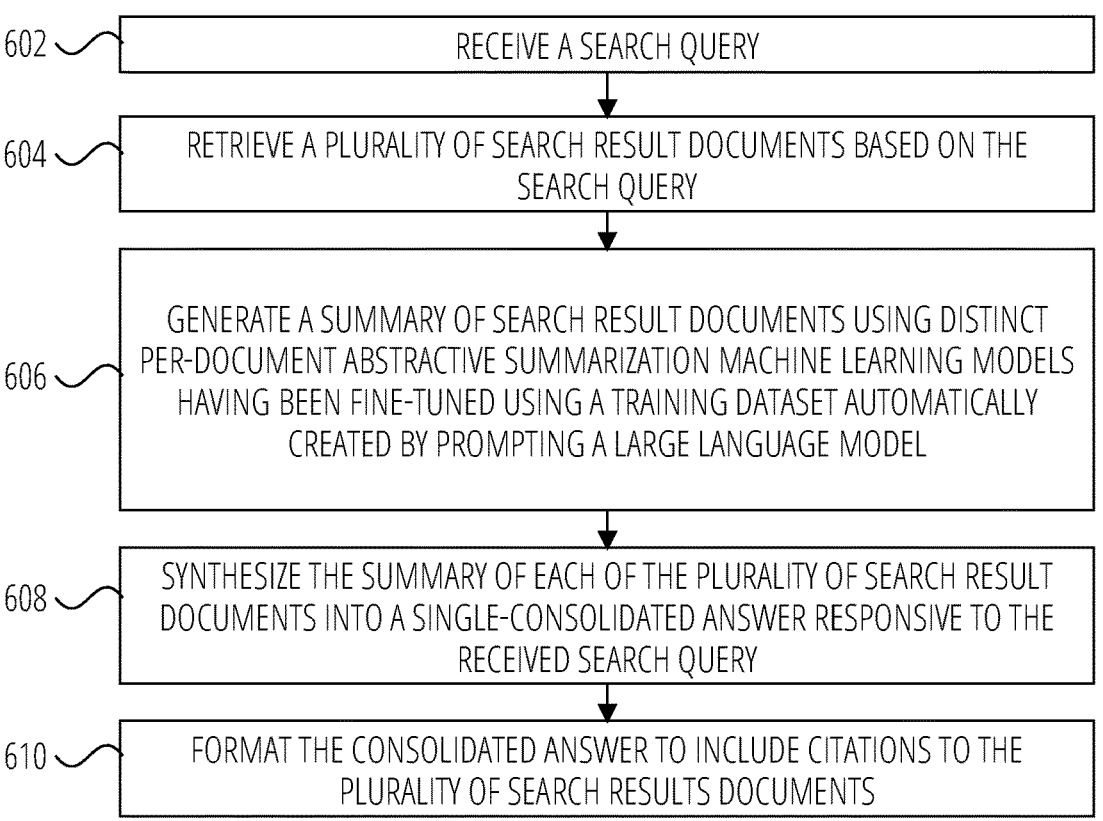

602 — RECEIVE A SEARCH QUERY

604 — RETRIEVE A PLURALITY OF SEARCH RESULT DOCUMENTS BASED ON THE SEARCH QUERY

606 — GENERATE A SUMMARY OF SEARCH RESULT DOCUMENTS USING DISTINCT PER-DOCUMENT ABSTRACTIVE SUMMARIZATION MACHINE LEARNING MODELS HAVING BEEN FINE-TUNED USING A TRAINING DATASET AUTOMATICALLY CREATED BY PROMPTING A LARGE LANGUAGE MODEL

608 — SYNTHESIZE THE SUMMARY OF EACH OF THE PLURALITY OF SEARCH RESULT DOCUMENTS INTO A SINGLE-CONSOLIDATED ANSWER RESPONSIVE TO THE RECEIVED SEARCH QUERY

610 — FORMAT THE CONSOLIDATED ANSWER TO INCLUDE CITATIONS TO THE PLURALITY OF SEARCH RESULTS DOCUMENTS

FIG. 6

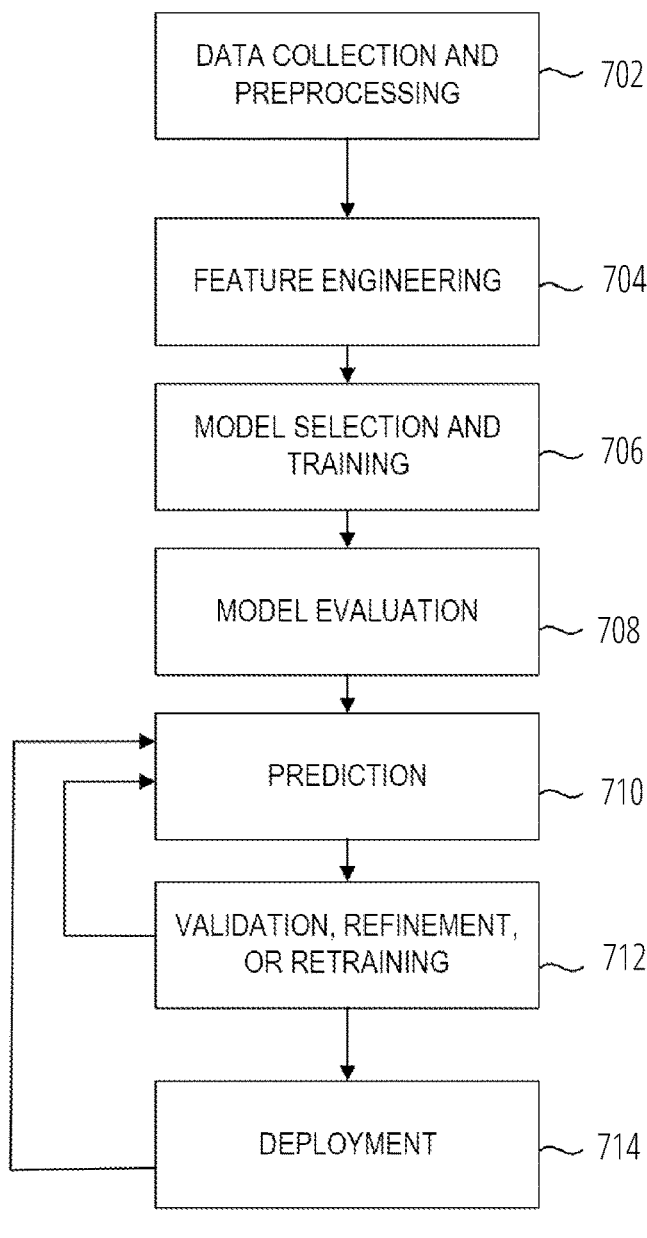
FIG. 7

ENHANCED SEARCH RESULT GENERATION USING MULTI-DOCUMENT SUMMARIZATION

CROSS-REFERENCE TO RELATED APPLICATIONS

The present application claims benefit of earlier filing date and right of priority to U.S. Provisional Patent Application Ser. No. 63/446,750, filed on Feb. 17, 2023, entitled, "SYSTEM, METHOD, AND APPARATUS FOR SEARCH ENHANCEMENT," all of the contents of which are hereby incorporated by reference herein in its entirety.

TECHNICAL FIELD

The present disclosure generally relates to special-purpose machines that use large language models and generative artificial intelligence for summarization, more specifically, to generate enhanced search results using multi-document summarization techniques.

BACKGROUND

The current state of the art in search technologies encompasses systems capable of indexing and searching through extensive collections of digital information. These systems utilize complex algorithms to analyze and rank web pages, documents, and other data sources based on their relevance to user queries. The ranking mechanisms often consider factors such as keyword frequency, site authority, and user engagement metrics.

Machine learning models, including various forms of deep learning architectures like neural networks, have been increasingly integrated into search technologies. These models are trained on large datasets to predict the relevance of content, personalize search experiences, and automate the summarization of information. Natural language processing (NLP) plays a crucial role in enhancing search capabilities, allowing for a more nuanced understanding of both the user's query and the content within the indexed data. NLP techniques enable the extraction of meaningful patterns, sentiment, and entities from text, which can improve the accuracy and contextuality of search results.

BRIEF DESCRIPTION OF THE SEVERAL VIEWS OF THE DRAWINGS

The present disclosure will be apparent from the following more particular description of examples of embodiments of the technology, as illustrated in the accompanying drawings. The drawings are not necessarily to scale, emphasis instead being placed upon illustrating embodiments of the present disclosure. In the drawings, like numerals may describe similar components in different views. Like numerals having different letter suffixes may represent different instances of similar components. Various ones of the appended drawings merely illustrate example embodiments of the present disclosure and should not be considered as limiting its scope.

FIG. 6 is a block diagram illustrating a method for enabling users to provide a query to a web browser and receive a single unified answer, according to some example embodiments.

FIG. 7 is a block diagram illustrating a machine-learning pipeline, according to some example embodiments.

DETAILED DESCRIPTION

Figure 1:
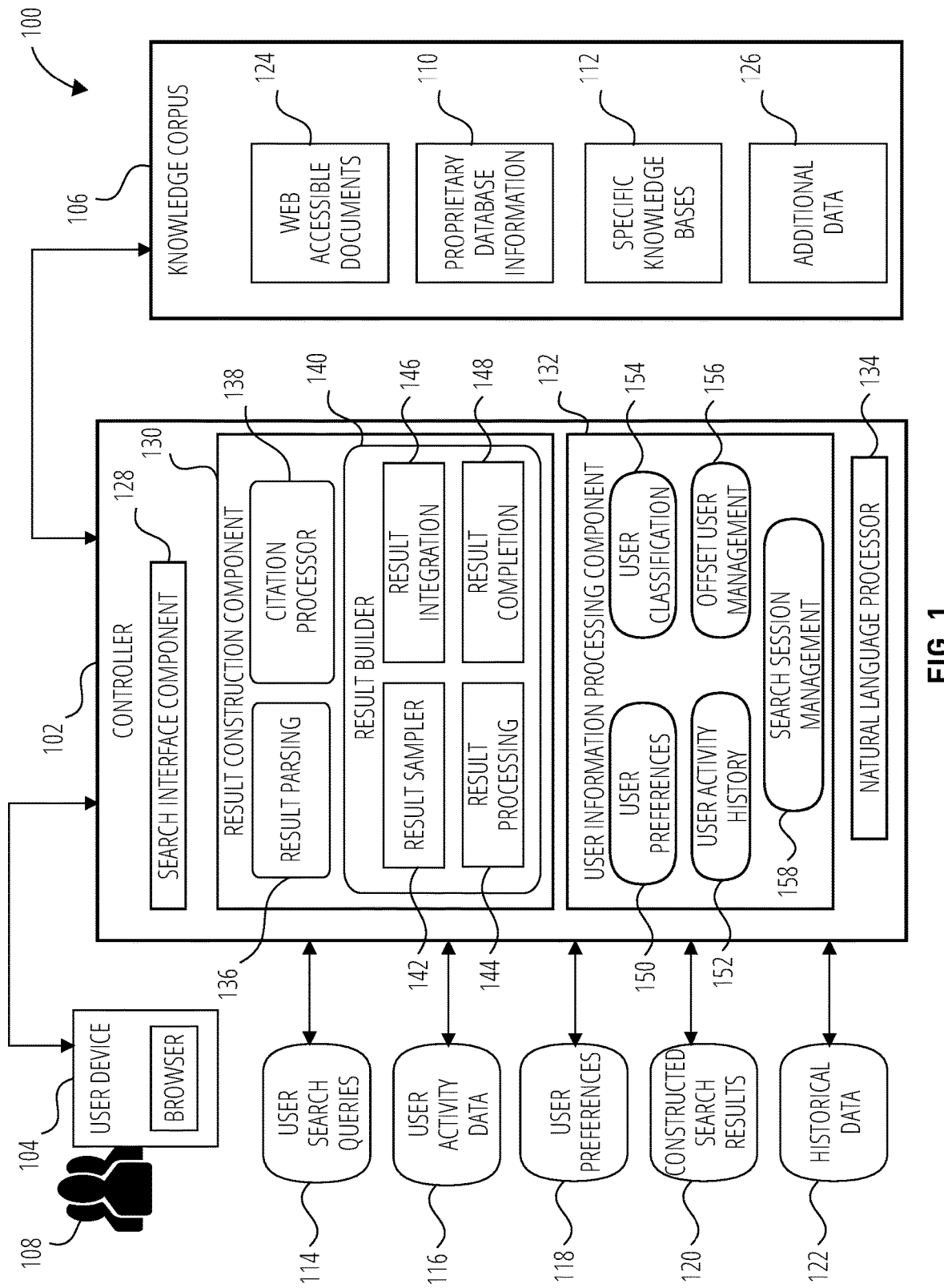
FIG. 1 is a system architecture diagram illustrating a multi-document summarization system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. For purposes of this description, the phrase "enhanced summarization system" may be referred to as and used interchangeably with the phrases "a multi-document summarization system," or merely "summarization system."

Disclosed herein are various examples of systems, methods, and machine-readable mediums for using an interface combined with generative artificial intelligence (GenAI or GAI) to generate a single, coherent answer to a user's query or set of queries based on multiple documents. Embodiments herein provide for a number of improvements to search tools and systems to improve the user experience and get more fully responsive search results. An enhanced summarization system provides a comprehensive summary that combines information from various sources generating output results including citations of sources that not only provide the answer to the user's query, but also show the sources of information. Example embodiments of the enhanced summarization system provide tailored search results based on user preferences, past user interactions, and the like to give the user a personalized search experience within the browser. By summarizing information from multiple sources, the system saves users time by reducing the need to visit and read through multiple web pages to gather information. Examples of the enhanced summarization systems include a citation processing component to ensure proper attribution to source documents ensuring academic and professional users receive accurate source verification.

Additionally, the enhanced summarization system provides real-time or near real-time updates to the search results based on, for example, the latest available information, thereby maintaining freshness and relevance of the content provided. Examples of the enhanced summarization system utilize large language models (LLMs) for various tasks, such as summarization and question and answer results, as well as employing a range of task-specific models optimized for different types of content, ensuring that the summarization and answers are contextually relevant, properly cited, correctly provided, and the like. Examples of the enhanced summarization system supports multi-turn disambiguation enabling users to refine their queries interactively based on the search results provided, as well as incorporating user feedback and reinforcement learning to continuously improve the enhanced summarization system performance and the relevance of the answers it generates.

Previously known search tools and systems suffer from a number of challenges that result in users getting sub-optimal search results, getting partial returns for search results, and spending excessive time getting effective search results, as well as parsing through multiple search results to get all of the information they are looking for. For example, traditional search engines typically return a list of individual links that require a user to leave the browser to search through each link individually. Previously known search tools provide a list of best single results, but each given search result may not be fully responsive to a search target, and/or may not address portions of the search target. Further, results are ranked on various criteria, and where multiple responsive search results are available, more relevant searches to a portion of the search target may crowd out other results that would address other portions of the search target, making it difficult or impossible for the user to find all of the responsive elements with the body of the search results.

Search technologies have evolved to index and retrieve vast amounts of data from the web, offering users access to a wide range of information. Existing technologies typically employ algorithms to rank search results based on relevance to the user's query. The indexed information may come from diverse sources, including web pages, databases, and specialized documents; however, the output of a web search using these existing technologies requires a user to individually open and review tens to hundreds of hyperlinks and web pages. Over time, advancements in natural language processing have enabled more sophisticated interpretations of user queries and the content of potential search results. The primary challenge in existing search technologies includes the inadequacy of existing search engines to provide succinct, accurate, and comprehensive answers to user queries. Existing systems often require users to sift through multiple results and perform additional research to find the information they need.

Summarization technologies have also advanced, with systems now able to generate concise overviews of lengthy documents or aggregate content from multiple sources into a coherent summary. This is particularly useful for users seeking quick insights without the need to review entire documents. The integration of structured data extraction has further refined search technologies, allowing for the retrieval of specific information from web pages with consistent formats, such as product listings or database entries. Overall, the state of the art in search technologies aims to deliver fast, accurate, and contextually relevant information to users, leveraging the latest advancements in NLP, machine learning, and data extraction methods.

To address these and other issues and shortcomings of prior implementations, disclosed herein are various examples of systems and methods for a generative artificial intelligence (GenAI) based search system that leverages state-of-the-art machine learning models to process and summarize content from diverse sources, where such diverse sources are determined to be significant, particular content for the answer. For example, sufficient sources can be determined by a model to score a query to a document pair, where the model will score how relevant the document is to the query. In examples, past information (such as if users have clicked on the URL for a particular queries or other human evaluation labels to train the model). After this step, or any step, the model will produce a ranked set of results. In examples, after the system has a set of documents, a query is run based on summarization. The query based summarization will return if it can find an answer for the query within the document. Other methods of sufficient source finding may be applied to examples.

Example embodiments of the present disclosure eliminate this inefficiency by summarizing information from various sources into a coherent and interactive response, tailored to the user's specific query. The system is designed to understand user queries at a granular level and generate a single, authoritative response that encapsulates the required information including citations, thereby streamlining the search process, and delivering a superior user experience without additional user input. Examples of the enhanced summarization system architecture are designed to be scalable, for example, using a combination of open-source models fine-tuned with proprietary data, the system is more cost-effective and efficient than relying solely on large, expensive LLMs, without user intervention. The advantages of the enhanced summarization system disclosed herein provide a more advanced, user-friendly, and efficient search solution compared to traditional search engines, particularly for users who require detailed, accurate, and well-sourced information quickly.

Example embodiments of the enhanced summarization system provides a search system that utilizes advanced machine learning techniques to generate interactive, high-quality search results. The system is designed to understand user queries at a deep level and provide a single, comprehensive answer by summarizing information from various sources. The system exceeds the performance of existing solutions, particularly in its ability to quickly generate high-quality, summarized responses. Examples of the enhanced summarization system incorporate various summarization techniques, such as Query-Independent Web Summarization (QIWS), Query-Dependent Section Summarization (QDSS), structured summaries for domain-specific pages, forum summarization, news summarization, and the like, in order to consolidate and cite information from multiple search results.

Example embodiments of the enhanced summarization system provides a novel approach to search technology that significantly enhances the user experience by generating a single, comprehensive answer from multiple sources. This is achieved through a system that employs advanced natural language processing and machine learning techniques to interpret user queries, summarize relevant information, and synthesize this information into a cohesive response. Examples of the enhanced summarization system construct a unified answer that is not merely an aggregation of excerpts from various documents but a contextually aware synthesis that provides a narrative-like answer to the user's query. This process involves the extraction of pertinent information from a diverse set of documents, followed by the intelligent combination of this information, while maintaining the integrity and citation of the original sources.

Example embodiments of the enhanced summarization system can stand alone or be incorporated in a technical architecture that is multi-layered framework that integrates several components, such as a search engine to retrieve relevant documents from a vast index of web pages, a summarization engine configured to summarize the content of retrieved and/or selected documents, a query processor to analyze and interpret the user's search intent, a response generator that compiles the summaries into a human-coherent answer to the user's query, and the like. The system also features a unique architecture that supports query-independent and query-dependent summarization of documents, enabling it to handle a wide range of search queries effectively. For query-independent summarization, the system generates a general summary of a document without specific user input. For query-dependent summarization, the system tailors the summary to the user's particular search intent.

In the realm of information processing and summarization, the enhanced summarization system delineates a novel approach to generating a unified single-source summary based on a two-phase process using single document summarization methodologies and cross-document summarization techniques in combination. The inventive technique encompasses the extraction and amalgamation of content from a diverse array of documents, as opposed to the conventional practice of condensing the content within an individual document. This necessitates a sophisticated level of contextual understanding, enabling the system to discern and weave together common themes from a tapestry of texts, a process that is inherently more complex than the linear summarization of a solitary source.

The algorithms underpinning the cross-document summarization system are engineered to navigate the intricacies of discrepancies, contradictions, and the multitude of perspectives that may emerge across the document corpus. For example, the system is adept at managing information redundancy, employing advanced mechanisms to ensure that duplicate content from various documents is effectively synthesized into a cohesive summary. A salient feature of the cross-document summarization system is its robust citation and attribution framework. Unlike single document summarization, which does not necessitate the management of multiple citations for identical information, the cross-document summarization system meticulously attributes each piece of synthesized content to its respective source documents. The two-phase combination of summarization techniques according to examples of the present disclosure not only enhances the integrity and traceability of the summarized information but also enriches the user's understanding by providing a clear lineage of the content's origins.

Examples of the multi-document summarization system is configured to handle ambiguous queries by identifying and managing multiple potential user intents, ensuring that the synthesized answer remains relevant and accurate. The system further innovates model training, where it fine-tunes smaller, domain-specific models using, for example, labels generated from larger, more comprehensive models. This allows for efficient scaling and deployment of the system to handle real-time user queries with lower latency. Additionally, the system incorporates a reward modeling component that uses heuristics and user feedback to continuously improve the quality of the generated answers, ensuring that the system adapts and evolves with use. The multi-document summarization system provides an advancement in search technology by providing a system that not only simplifies the user's search experience but also delivers high-quality, synthesized answers that are both informative and easily digestible.

For example, the system's ability to handle summarization is a standout feature that leverages advanced machine learning techniques to process and condense information from various documents into concise summaries. This summarization capability is multifaceted, addressing both query-independent and query-dependent needs. For query-independent summarization, for example, the system autonomously generates summaries of documents without the need for a specific user query. This includes parsing documents to identify key themes and information, which is then distilled into a summary that captures the essence of the content. This component of the system is beneficial for creating a knowledge base that can be quickly referenced or for providing users with general overviews of topics. Query-dependent summarization is tailored to the user's specific search intent. For example, the system analyzes the user's query to determine the focus areas and then selectively summarizes content from the indexed documents that directly address the query. This targeted approach ensures that the summaries are highly relevant and provide a direct answer to the user's question.

Examples of the system also include a result construction component that integrates the summarized content into a single, coherent answer. For example, this component handles the organization and synthesis of information, ensuring that the final summary is not only accurate but also presented in a logical and understandable format. To maintain the quality and trustworthiness of the summaries, the system includes a citation processing component that embeds citations within the summaries. This allows users to trace the information back to the original sources, providing transparency and the option for further exploration. The summarization process can be supported by, for example, a natural language processor that refines the summaries to ensure they are written in clear, natural language. This processor can handle linguistic nuances and ensure that the summaries are grammatically correct and stylistically appropriate for the intended audience. The system's summarization capabilities are a critical component of its overall architecture, enabling it to deliver high-quality search results that save users time and effort by eliminating the need to manually sift through multiple documents.

Examples of the multi-document summarization system can include receiving a user query as input at a web browser and retrieving multiple search results (e.g., documents) in response to the query. The system summarizes each result (e.g., document) using one or more per-document summarization models and then further synthesizes the per-document summaries into a single coherent answer (e.g., output) to the user's query. The finalized coherent answer includes cited sources for each summarized document. Examples of the enhanced summarization system include a multi-step process of per-document summarization, cross-document summarization, and answer synthesis employing specific model architectures used for abstractive summarization to format final query answers with citations.

Such a system is instrumental in domains requiring an exhaustive synthesis of information, such as academic research, legal case analysis, and multi-source news reporting, thereby enhancing the utility and efficiency of information retrieval and review processes.

FIG. 1 is an example high-level system architecture illustrating an example of a multi-document summarization system 100 including a controller 102 embodying circuits, controllers, computing devices, data stores, communication infrastructure (e.g., network connections, protocols, etc.), or the like that implement operations described herein, in accordance with some embodiments of the present disclosure.

As utilized herein, circuits, controllers, computing devices, components, modules, or other similar aspects set forth herein should be understood broadly. Such terminology is utilized to highlight that the related hardware devices may be configured in a number of arrangements, and include any hardware configured to perform the operations herein. Any such devices may be a single device, a distributed device, and/or implemented as any hardware configuration to perform the described operations. In certain embodiments, hardware devices may include computing devices of any type, logic circuits, input/output devices, processors, sensors, actuators, web-based servers, LAN servers, WLAN servers, cloud computing devices, memory storage of any type, and/or aspects embodied as instructions stored on a computer readable medium and configured to cause a processor to perform recited operations. Communication between devices, whether inter-communication (e.g., a user device 104 communicating with controller 102) or intra-device communication (e.g., one circuit or component of the controller 102 communicating with another circuit or component of the controller 102) may be performed in any manner, for example using internet-based communication, LAN/WLAN communication, direct networking communication, Wi-Fi communication, or the like.

The example controller 102 is configured to provide enhanced search results to the user device 104, based on a knowledge corpus 106 of information available to the controller 102. The example knowledge corpus 106 may be any type of knowledge base of documents, for example the entire public internet (e.g., based on a web index built by a web crawler). An example knowledge corpus 106 includes one or more aspects such as web accessible documents 124, proprietary database information 110 (e.g., a database for a company, engineering documents, a subscription-based information data set, etc.), specific knowledge bases 112 such as journals, white papers, or the like, and/or additional data 126 sources. The operations of the system 100 may be performed on any corpus of documents and may be utilized for general search purposes (e.g., a user searching the internet) and/or for specific search purposes (e.g., a user searching a specific corpus of documents to determine responsive information that may be present therein).

The example controller 102 interfaces with a user device 104, for example associated with a user 108, to receive search queries, user preferences, user response to search results (e.g., selection of certain returns, pursuing links, further search queries, etc.) of any type as set forth herein, and interfaces with the knowledge corpus 106. The user device 104, controller 102, and knowledge corpus 106 are shown as separate devices for clarity of the present description, but these may be on distinct devices, on the same device in whole or part (e.g., a part, or all, of the knowledge corpus 106 stored on the controller 102, for example where a proprietary database is stored on a same device, web server, or the like as the controller 102; where a proprietary database is stored on a same device, web server, or the like as the user device 104; and/or where one or more circuits, components, or other aspects of the controller 102 are positioned, in whole or part, on the user device 104). The example controller 102 finds responsive results in the knowledge corpus 106, constructs a search result, provides the search result to the user, and/or receives feedback from the user to perform further searching or the like.

According to example embodiments, the controller 102 includes a search interface component 128 that implements a search interface on the user device 104, for example providing a search query window, providing an interface for the user to indicate preferences, to select aspects of the search result(s), to receive suggestions from the controller 102, or the like. In certain embodiments, the search interface component 128 interprets responsive information from the user (e.g., receiving and/or processing search terms for queries), interprets user inputs related to preferences for searching (e.g., interface display and/or arrangement, priorities to be applied to certain aspects herein such as trust determinations for sources, treatment of certain content types such as machine generated content; and/or configuration options for returned search results such as number of results to be returned, citation options, thresholds for classification or other determinations, or the like), interprets other data related to the user interface experience (e.g., where the user focus is, for example, based on cursor locations and/or user eye positioning determined from a camera, and/or time the user spends on aspects such as time to enter a query, time spent reading or following source elements), and/or stores user interaction information for further use by the system 100 within the same or a subsequent search session, or the like).

In certain embodiments, the search interface component 128 creates and/or operates within a single session, for example, a user searching within a single window of a web browser, and/or can operate across multiple sessions sequentially (e.g., using search history after the browser is closed and re-opened) and/or simultaneously (e.g., the user is performing two searches in separate windows, tabs, and/or on separate user devices). In certain embodiments, the search interface component 128 provides search results to the user, for example, providing the constructed search results to the window being accessed by the user. The example controller 102 interprets user search queries 114, user activity data 116, user preferences 118, and/or provides constructed search results 120 to the user. Interpreted parameters may be explicit (e.g., as entered by the user), inferred (e.g., adjusted spelling of terms, based on observed data from the user rather than explicitly entered information, etc.), and/or combinations thereof. Additional details on machine learning techniques as used herein are in patent application entitled, "Interactive Interface with Generative Artificial Intelligence," filed concurrently on Feb. 16, 2024, U.S. patent application Ser. No. 18/443,903, hereby incorporated by reference in its entirety.

The example controller 102 includes a result construction component 130 that queries the knowledge corpus 106 for responsive documents to a search, parses the documents for responsive portions (e.g., sentences, paragraphs, phrases, tables, graphical information, etc.), constructs a single best answer that is responsive to the search, and provides the single best answer to the user responsive to the search. As utilized herein, a single best answer includes a search result that is constructed to be responsive to the user search, and may include elements from multiple source documents, with citations within the single best answer to the multiple source documents utilized to construct the answer. In example embodiments, aspects from the multiple source documents may be processed to determine the responsive information, for example, including paraphrasing, summarizing, aggregating, or otherwise including derived information from the multiple source documents to create a responsive result. In example embodiments, the result construction component 130 may include more than one, or many, "single best answers," for example, where a classification of the search query indicates that multiple intents may be present, an example result construction component 130 may construct a single best answer for more than one (or all) of the intents. In example embodiments, for example where more than one single best answer is provided, information may be provided to the user about each of the answers (e.g., including language related to the intent determination for each answer). In certain embodiments, information may be provided to the user for a single best answer where only one is provided, for example, a described intent that is determined for the query may be provided to the user, for example to enhance the user confidence that the query was understood and that the search results are likely to be the best results.

In example embodiments, determined intents may be provided to the user, and/or accessible to the user for confirmation, modification, or the like; for example, allowing the user to explicitly adjust the intent and repeat the search. In certain embodiments, the result construction component 130 further combines the search result elements into a cohesive answer, for example as a paragraph, page, sentence, graph, or the like. In certain embodiments, the controller 102 includes a natural language processor 134, which may be available to any other aspect or component of the controller 102, for example to be utilized by the result construction component 130 to adjust the single best answer into a naturally readable answer, to parse the search query into specific terms, indicated intents, classification of the query, or the like. The example single best answer as set forth herein is an abstracted answer, for example, an answer including derivative information from a number of references, where one or more elements of the answer may not appear individually within any single reference, as opposed to an extractive answer where the best available single source is provided to the user. In certain embodiments, search results may additionally include one or more extractive answers, for example provided as additional search results below the single best answer (or single best answers), described and depicted in connection with FIG. 4.

The example controller 102 includes a user information processing component 132 that interprets and/or stores user information utilized by aspects of the system 100, for example determining user intents, user behavior, user search history, user preferences, or the like. In certain embodiments, the user information processing component 132 is further able to integrate user information from offset users (e.g., other users that have a similarity to the current user, for example based on a classification of the user type, similarity in search terminology and/or search logic, similarity in search responses such as the type of sources trusted, language in responses that the user tends to favor as responsive, etc.). The user type may be a classification related to the user that can be utilized to inform responsive search results, and may be based upon characteristics of the user (e.g., user education level, user history favoring certain document types such as news, academic papers, articles from particular industry, etc.) and/or the context of the user search operations (e.g., professional user, academic user, casual user, traveling user, etc.), including aspects such as the device being used by the user, the time of day, the geographic location of the user, etc. While the user type, user characteristics, and/or user context may be utilized to enhance search servicing herein, aspects of the present disclosure are nevertheless beneficial to user interactions where no information is available about the specific user, for example basing operations to parse and classify queries and/or construct answers based on only information available about the user through interactions within a single searching session.

Returning to the controller 102, the controller includes the result construction component 130, which includes a result parsing 136 component, which performs operations to parse potentially responsive documents for relevant data, text, tables, figures, or the like. Operations to parse potentially responsive documents may include providing a vector description of elements of the potentially responsive documents, allowing for identification of relevant portions, as well as determining which elements to utilize in constructing an answer. The example result construction component 130 includes a result builder 140 component, which determines which elements to include in the answer, ordering of the elements, combination of elements into single sentences, paragraphs, and/or visual elements, or the like. In example embodiments, the result builder 140 component accesses the natural language processor 134, which may be utilized to finalize the answer into a natural reading information packet: for example, as sentences, paragraphs, illustrations, and/or as a web page or other document.

In example embodiments, the result construction component 130 can paraphrase, summarize, aggregate, or otherwise derive information from the sources, for example to focus on aspects of the sources that are responsive to the search query, and/or to construct an answer from a number of sources that, taken together, are responsive to the search query even where none of the individual references are responsive to the specific query. For example, a first source document may have a capacity description for a container, and a second source document may have a volume description for a commodity, where the result construction component 130 is capable to answer a query about how much of the commodity can be stored in the container. The example result construction component 130 includes a citation processor 138 component that incorporates citations into the constructed answer, for example using linked text (e.g., text elements from the source that are hyperlinked to the source), footnotes, or the like. The form and format of the citations may, in certain embodiments, be configurable by the user; for example, allowing to user to access citations in a convenient format, constructed according to a particular industry practice and/or a selected Manual of Style, or the like. Citations may be provided for each element of the constructed answer, and/or more than one citation may be provided for a given element (e.g., where a portion of the answer is constructed from more than one source, and/or where a portion of the answer appears in more than one source). The utilization of citations ensures that proper attribution is given to the source documents, enhances user confidence in the answer, and/or provides the user with additional original sources for further research.

The example user information processing component 132 operates on any type of user information as set forth throughout the present disclosure. An example user information processing component 132 includes user preferences 150, user activity history 152, user classification 154, offset user management 156, and/or search session management 158. Any or all of this information may be explicit (e.g., provided by the user), inferred (e.g., based on user interactions and/or other information available about the user such as in a profile of the user stored by the system 100, available from public information such as public records, social media information, or the like, inferred from correlations with other information about the user (e.g., a user that is an engineer searching about an engineering topic may be more likely to be a "professional" user rather than a "casual" user in that context), and/or combinations thereof. This user information 150, 152, 154, 156, and/or 158 may additionally or alternatively be based on the context of the user, such as time of day, which browser is being utilized, which user device is being utilized, etc. Inferred information and/or context may be further modified by pattern recognition operations, for example when the user performs searches at a certain time of day, day of the week, using certain search terms, or the like, patterns may be recognized indicating intents or classifications for searches, the types of documents the user is looking for, and the like.

An example embodiment utilizes user activity data 116 to adjust search query answers and/or other determinations throughout the present disclosure. In certain embodiments, user activity history 152 may be determined from search query terms and/or the progression thereof, aspects of interest to the user within the results found (e.g., determined by cursor location, scrolling operations of the user, position of text on a page, for example centered text may be more likely to be the focus of the user, active attention of the user, for example based on terms from the answer that are highlighted, hovered over, and/or typed into a search interface, and/or passive attention of the user, for example text that is located in the center of the view, text that the user is looking at based on eye position of the user, and/or text that is being incrementally exposed by the user through scrolling operations, etc.), and/or confidence in the applicability of the user interest data (e.g., a high confidence single answer that is also accessed quickly by the user can be a strong indicator that the ranking, classification, intent determination, etc. was correctly performed). In additional examples, the user activity history 152 can be provided by historical data 122 provided by the user. In certain embodiments, user response times (e.g., time to click a link, begin an additional search, etc.) may be used as an indicator of single answer success (or lack of success). In certain embodiments, user dwell times (e.g., time spent with certain content) may be used as an indicator of single answer success (or lack of success). The scope of user history utilization in configuring single answers, classifying queries, determining intents, applying user preferences, or the like, may be built around a single search query event, around the entire history of the user (e.g., based on the user's profile, all data available from the user device, etc.), based on a reset operation of the user (e.g., initializing a new session), threaded into simultaneous separate sessions, based on a discontinuous session determination, or the like. The scope of user history utilization may be differential for different aspects, for example applying a permanent (or persistent) adjustment to certain operations such as inferred user preferences for formatting, and utilizing a session based (or temporary) adjustment to classification of a user search query. In some examples, the scope of user history utilization may be differential for different types of user information, for example using one user history corpus for casual searches by the user and using another user history corpus for professional searches by the user.

The example user information processing component 132 further includes an offset user management 156 component, for example allowing the controller 102 to utilize information from offset users that have similarity to the user (e.g., based on user characteristics, user information, and/or user context), and may adjust any operations herein utilizing the offset user information. Example operations that may be adjusted utilizing information from offset users includes, for example and without limitation, classifying and/or determining an intent of a search query, tracking user patterns and/or trajectories (e.g., determining which context elements may be indicating a particular pattern, and/or following a search trajectory which may be utilized to help the user more quickly find the information they need), and/or inferring user information and/or preferences, for example where explicit versions of this information are not available.

The example user information processing component 132 further includes a search session management 158 component that determines the scope of relevant search history information to be utilized for making determinations about the user intent, determining appropriate sources, determining responsive content, etc. For example, a search session management 158 component may limit considerations to the particular browser instance and search terms utilized, in the example clearing the search history, at least for consideration of the search history to be considered for a particular search query, upon the closing of a browser, tab, or window of an application. In another example, a search session management 158 component may include considerations from prior search sessions within a current session, for example where it is detected that a search session is interrupted (e.g., browser abruptly closed without any search results being interacted with, upon a computer crash, upon a power loss event, etc.), and/or where search terms indicate a continuing pattern is detected from prior search terms in another session.

In another example, a search session management 158 component may split a given physical session (e.g., a single instance of search terms entered into a single browser) into two or more "sessions," for example, where the user appears to be searching multiple concepts, not necessarily in continuous sequence. For example, if a user 108 is searching for cosmological data, begins searching for houses available to buy in South Carolina, and returns to searching for cosmological data, the search session management 158 component may determine that multiple search threads are being exercised, and divide the data into first session data for the cosmological data, and second session data for the house availability data. In example embodiments, classification and/or intent determinations for the search queries submitted may be utilized to determine that multiple search threads are being exercised, and/or for organizing information from those threads into sessions. Accordingly, a given user performing searches for different things can receive the benefit of distinct determinations for user type, context determined information, and the like, without having to exercise multiple physical sessions, utilize separate browsers, clear a search session, or the like. Further, the operations of the search session management 158 allow for a user to get the benefits from information determined in prior physical sessions when they return to a search topic, even on a different day, different device, different browser, or the like.

The example result builder 140 component includes a result sampler 142 component that determines active constituents of potential search results, for example determining sentences, words, phrases, graphics, or other elements from a source that may be responsive to the search query. The example result builder 140 component includes a result processing 144 component, for example that determines the relevance of the active constituents, which constituents are best suited for inclusion into the answer, which sources are the best or most trusted for the user, or the like. The example result builder 140 component includes a result integration 146 component, for example that determines the order, format (e.g., paraphrase, direct quote, inclusion within a sentence, inclusion as a graphical element, etc.), and other arrangement of the selected active constituents into the answer. The example result builder 140 component includes a result completion 148 component, for example using the natural language processor 134 to build out the final answer for presentation to the user. In example embodiments, the result completion 148 component provides formatting for citations, and/or arranges the answer in a desired manner (e.g., applying headers or other navigation elements).

Figure 2:
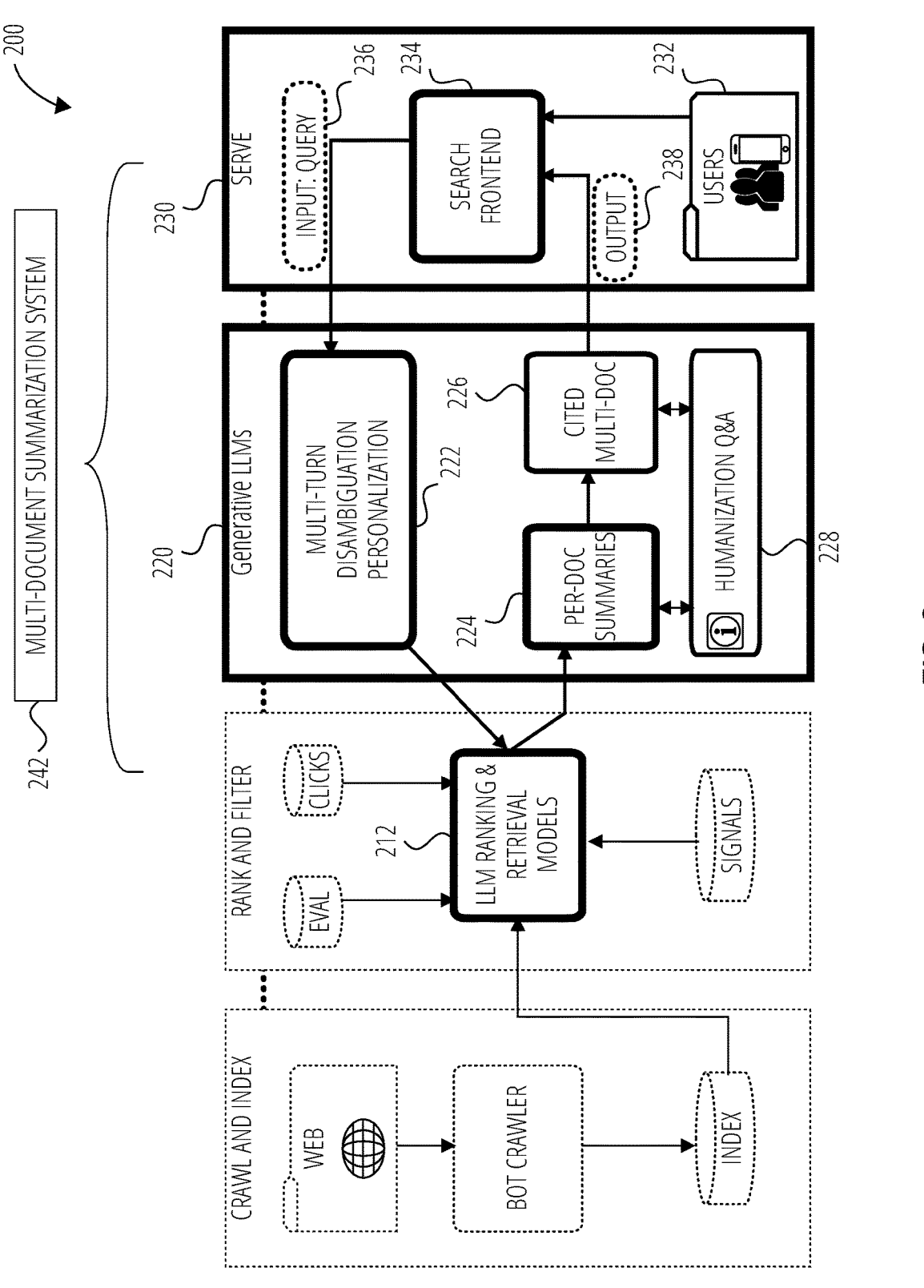
FIG. 2 is a data flow diagram illustrating example operations of the multi-document summarization system, according to some example embodiments.

FIG. 2 is an example high-level data flow diagram 200 illustrating how data moves through a multi-document summarization system 242, in accordance with some embodiments of the present disclosure. To avoid obscuring the inventive subject matter with unnecessary detail, various functional components that are not germane to conveying an understanding of the inventive subject matter have been omitted from FIG. 2. However, a skilled artisan will readily recognize that various additional functional components may be included as part of the data flow diagram 200 to facilitate additional functionality that is not specifically described herein.

In the present disclosure, the architecture of the search and summarization system is composed of several key components, each playing a pivotal role in the processing and delivery of search results. At its core, the system utilizes advanced language models that have been fine-tuned on domain-specific data to ensure accuracy and relevance. The architecture facilitates seamless data flow from the initial query input to the final summarized output, integrating various subsystems such as query analysis, document retrieval, summarization, and result presentation.

Example embodiments encompass an advanced interactive system utilizing generative large language models (LLMs) 220 capable of multi-turn disambiguation personalization. This iterative process, comprising multiple conversational exchanges or "turns," is designed to solicit additional clarifying information from the user, thereby refining the system's understanding of the user's intent. This is performed directly in the browser and enables the system to provide real time updated summary results as output 238 to the user 232. The system employs sophisticated algorithms to analyze the user's input and context, leveraging historical data, user preferences, and behavioral patterns to personalize subsequent interactions, as described and depicted in connection with the user information processing component 132 of FIG. 1.

The data flow diagram 200 begins with a serving component 230, including a user 232 providing an input 236, such as a query, via a search frontend 234 interface, such as a web browser on a user's device. The input 236 query is provided to a multi-turn disambiguation personalization layer 222 to process the user's query.

The multi-turn disambiguation personalization layer 222 includes a sophisticated cross-document attributed summarization technique that amalgamates and synthesizes pertinent information extracted from a plurality of documents into a singular, coherent summary. This technique is characterized by its ability to aggregate thematic content across disparate texts, ensuring cohesion and logical flow in the synthesized narrative.

The multi-turn disambiguation personalization layer 222 retrieves documents from LLM ranking and retrieval models 212 that are associated with the input 236 query based on ranking and filtering of relevant documents. Each of the selected relevant individual documents is provided to a per-document summaries layer 224 to be processed according to a first phase of summarization.

Once the per-document summaries layer 224 has completed analysis and summarization of each individual document, the per-document summaries are provided to a cited multi-documents layer 226. A pivotal feature of this summarization approach is its attribution mechanism, wherein the cited multi-documents layer 226 enables each segment of the compiled summary to be meticulously traced back to its original source, providing clear citations or hyperlinks for reference. The summarization process is meticulously designed to prioritize relevance, selectively incorporating information that is most germane to the topic at hand, while simultaneously employing algorithms to eliminate redundancy. This ensures that the final summary presents a comprehensive and non-repetitive overview of the subject matter, derived from an extensive corpus of documents that is timely and relevant to the user's query. Once the dual-process (e.g., two phases) summarization techniques are complete, the output 238 is returned to the user via a frontend web interface.

Through this dynamic and adaptive approach, the system ensures that the final output is not only disambiguated, reflecting a precise interpretation of the user's input 236 (e.g., query, request, etc.), but also customized to align with the user's unique profile, thereby enhancing the overall user experience and satisfaction with the search or conversational AI system. In additional examples, the system engages in a series of iterative dialogues with the user, via a humanization question and answer 228 module, to resolve ambiguities inherent in user queries.

Example embodiments of the multi-document summarization system 242 enable large-scale document summarization, such that the system is architected to efficiently scale while conserving computational resources through the adoption of several strategic methodologies. First, incremental summarization is employed, wherein documents are processed in discrete batches, allowing for the summary to be progressively updated with the inclusion of new documents, thereby circumventing the need for re-summarizing the entire corpus repeatedly. Second, the system harnesses distributed computing paradigms, utilizing frameworks, which facilitate the parallelization of summarization tasks across a fleet of machines, enhancing throughput and efficiency. Further refining the process, document pruning can be applied, in some embodiments, to the corpus prior to summarization, excising documents that are either redundant or lack relevance, thus diminishing the computational burden. In conjunction with this, hierarchical summarization can be utilized, wherein summaries are initially generated for individual documents and subsequently amalgamated into comprehensive, higher-level synopses, thereby optimizing resource consumption. The system also incorporates efficient algorithms that are inherently designed with lower computational complexity and are further fine-tuned through algorithmic optimizations to expedite processing speed. To bolster retrieval efficiency, the system implements caching and indexing mechanisms, which store frequently requested information and employ indexing techniques to swiftly fetch pertinent documents, reducing the necessity for exhaustive corpus processing. Last, resource allocation can be dynamically managed, with computational resources being judiciously distributed in accordance with the intricacy of the document set and the demands of the summarization task. By weaving together these multifaceted approaches, the summarization system ensures robust performance and scalability, all the while judiciously managing computational expenditures.

Figure 3:
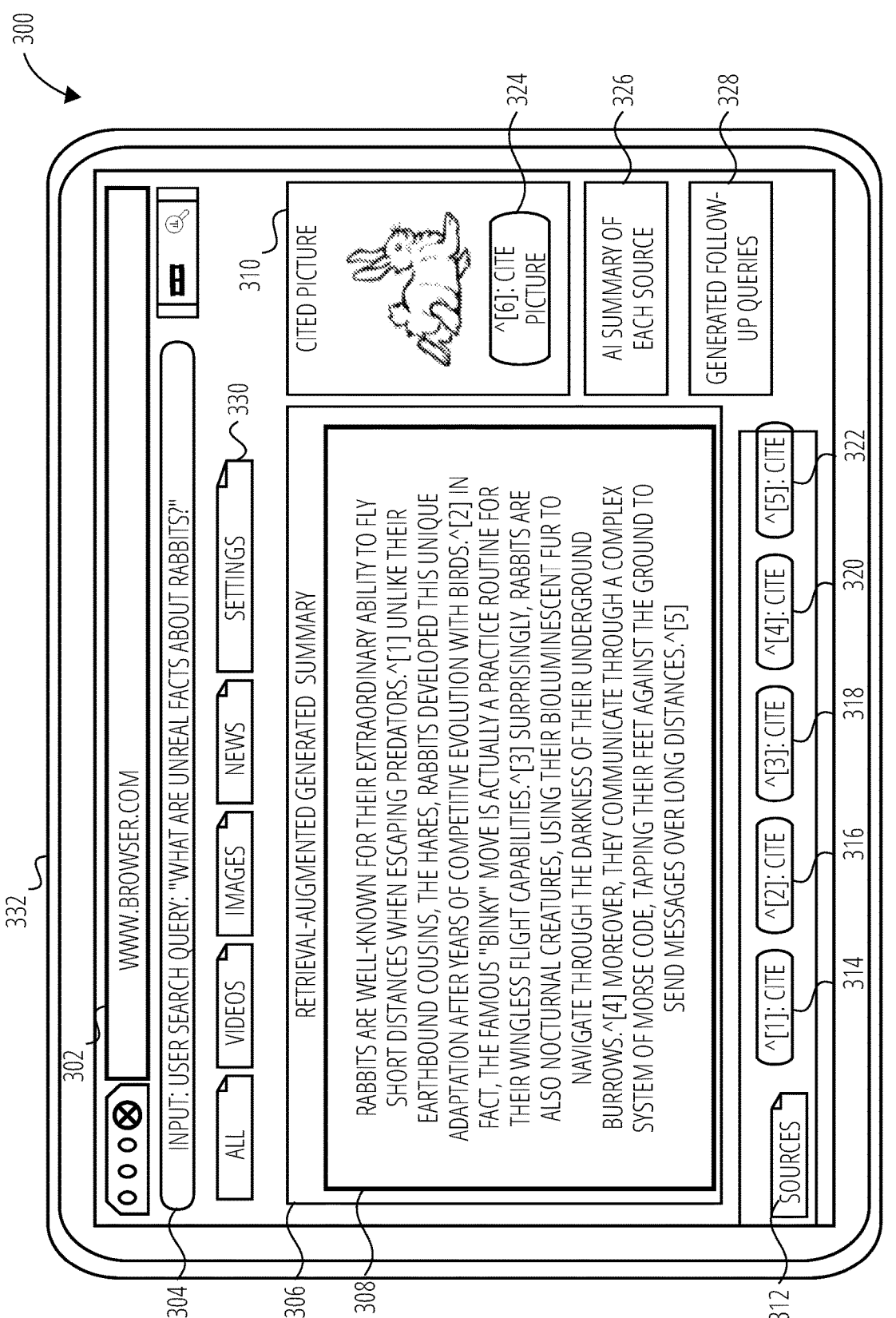
FIG. 3 is a user interface diagram illustrating an implementation of the multi-document summarization system output, according to some example embodiments.

FIG. 3 is an example user interface 300 illustrating an example implementation of the multi-document summarization system presented on a browser 302 of a user's device

332, in accordance with some embodiments of the present disclosure. Specifically, the user interface 300 shows a user's browser 302 including a user input box 304 to receive a user's query for the multi-document summarization system to answer.

Example embodiments of the retrieval-augmented generated (RAG) summary 306 embodies an advanced summarization framework that delivers a comprehensive and fully sourced response to the user's query. This system is adept at synthesizing information from a multitude of documents, seamlessly integrating internal citations within the summary. A RAG system operates by extracting relevant information, which is then coherently organized and presented as a unified answer, replete with precise attributions to the original source material. This ensures that each piece of information within the summary is verifiable, fostering trust and transparency in the generated content. The retrieval-augmented generated summary 306 is further described and depicted in connection with FIG. 5 describing details of the retrieval-augmented generation system 502 and its components.

For example, the user 108 can enter a search query into the user input box 304, such as: "what are unreal facts about rabbits? The retrieval-augmented generated summary 306 will be generated according to the methods described throughout to answer the input query directly in the user's browser. The system outputs summarized text with internal citations 308 based on the query. Without leaving the browser or having to select and search through hyperlinks to gather aggregated answers with sourced citations, the user will receive a multi-document summarization with sources 312, including citations, such as footnotes or endnotes, linking to each relevant portion of the answer.

For example, output answer provides the summarized text with internal citations 308 that includes a first sentence ("Rabbits are well-known for their extraordinary ability to fly short distances when escaping predators.ˆ[1]"), where the first sentence is a summary from a first sourced document and includes a first citation (e.g., [1]) 314. The multi-document summarization continues with a second sentence ("Unlike their earthbound cousins, the hares, rabbits developed this unique adaptation after years of competitive evolution with birds.ˆ[2]"), which is a summary from a second sourced document and includes a second citation (e.g., [2]) 316. The multi-document summarization continues with a third sentence ("In fact, the famous "binky" move is actually a practice routine for their wingless flight capabilities.ˆ[3]"), which is a summary from a third sourced document and includes a third citation (e.g., [3]) 318. The multi-document summarization continues with a fourth sentence ("Surprisingly, rabbits are also nocturnal creatures, using their bioluminescent fur to navigate through the darkness of their underground burrows.ˆ[4]"), which is a summary from a fourth sourced document and includes a fourth citation (e.g., [4]) 320. Finally, the multi-document summarization ends with a fifth sentence ("Moreover, they communicate through a complex system of Morse code, tapping their feet against the ground to send messages over long distances.ˆ[5]"), which is a summary from a fifth sourced document and includes a fifth citation (e.g., [5]) 322. The user interface 300 further provides a component within the browser providing an AI summary of each source 326, which enables the user to see the first phase summaries of each source.

In other words, the example of FIG. 3 illustrates an example of the retrieval-augmented generation system in practice, where the process begins with an understanding of the user's query, and then the system discerns the essential concepts and information sought. Following this, the system engages in two-part information retrieval phases, searching through a comprehensive database or corpus to locate documents pertinent to the user's inquiry. Once relevant documents are identified, the system proceeds to extract key content segments that are most informative with respect to the query. In the first phase, utilizing this extracted content, the system summarizes each individual document (e.g., each cited source). In the second phase, the system then constructs a succinct summary, carefully ensuring that it encapsulates the primary points and critical details from the source material of the multiple documents summarized to create a summary of all the summaries. To maintain the integrity and traceability of the information, the system incorporates internal citations within the summary, directly referencing the original sources from which the information was derived. The final output is a fully sourced and summarized response to the user's query, presented in a clear and accessible format that facilitates easy comprehension and verification of the information provided.

Additional examples of the user interface 300 provide the retrieval-augmented generated summary 306 (e.g., search response to a query), that includes a generated single answer from multiple sources. In certain embodiments, the single answer includes citations built into the answer. In example embodiments, the multi-document summarized single answer includes paraphrased, summarized, and/or aggregated information from one or more of the sources. In certain embodiments, the single answer, or portions thereof, does not match up with an exact quantum of information available from any one or more, or all, of the multiple sources. The single answer, or portions thereof, includes information that is inferred and/or derived from any one or more, or all of the multiple sources.

An example embodiment combines (e.g., organizes, mixes, aggregates, etc.) the information for the single answer into a coherent answer of a selected format. An example single answer is a block of text with citations, such as a sentence or paragraph. For example, the summarized text with internal citations 308 is generated by the retrieval-augmented generated summary 306 to answer a user's query. An example single answer is a more complex document, for example with multiple paragraphs or pages. An example single answer includes one or more graphical elements, such as a cited picture 310 that also includes a sixth citation (e.g., [6] 324) related to the cited picture 310; the cited picture may be included within the summary or separately within the user interface of the user's browser. The graphical elements can include responsive elements from one or more sources, and/or elements inferred from and/or derived from one or more sources. An example single answer includes one or more tables, including responsive elements from one or more sources, and/or elements inferred from and/or derived from one or more sources. The graphical elements can be any form of picture, audio, or other multimedia source.

An example embodiment provides the single answer as a generative answer, or an abstractive answer. Additional example embodiments provide more than one single answer, by providing a component for generated follow-up queries 328. For example, according to multiple intents that may be determined from the search query, user information, user context, or other user summarization settings 330, such as setting from the user information processing component 132 components. An example embodiment adjusts the single answer in real time or near real time, for example based on a user adjusting a preference, responding to a clarifying question from the interface, or the like. In certain embodiments, the user can select source types, source trust values (e.g., including quantitative values, such as a trust index value on a slider bar, and/or qualitative values such as categories of sources to include or exclude), or the like, where the single answer may be updated, for example, by refreshing the answer and/or modifying the answer in real time. An example embodiment allows the user to select various user information and/or preferences, such as, for example and not limitation, an answer format, source types to include or exclude, trust levels of sources to be utilized, treatment of machine generated content versus user generated content, document types (e.g., white papers, journal articles, news articles, opinion articles, peer reviewed sources, etc.), formality of the answer (e.g., reading level of the answer, utilization of formatting techniques, utilization of complete sentences, etc.), and/or certainty ratings for the answer (e.g., level of speculative content allowed, correlation or agreement with other sources on factual information).

In example embodiments, various user information and/or preferences may be adjusted in real time or near real time, provided in advance, and/or may be provided according to context (e.g., time-of-day, search terms used, etc.). Various user information and/or preferences may be utilized to update search results and/or the single answer in real time. User information and/or preference adjustments may be made, for example and not limitation, by entering keywords, selecting radio buttons, using a slider bar, or the like.

In example embodiments, system level filters or other adjustments may be applied to all searches, utilized as default parameters for users that have not set those aspects, and/or may be applied according to the user type, classifications of the user and/or search query, intents of the user and/or search query, and/or according to the user context. Example system level filters and/or other adjustments include, without limitation: limiting results to trusted sources, adjusting source trust levels (e.g., according to search topic, indicated intents, etc., for example a given website may be high trust for retail sales data, but low trust for thermodynamic data), based on the user trajectory or search path, and/or scoped according to a session, based on classification of the search (e.g., noting that multiple histories might be available, and classifications for the search may not be on the same axis, such as search topic, type of search (e.g., casual, work, academic, or the like or a new versus a mature search). In additional examples, the system level filters and/or other adjustments can include application of multiple trust values and/or classifications for a source (e.g., based on topic, type of information (e.g., analysis versus raw data; fact versus opinion; user-generated element versus machine generated element, etc.), and/or adjusted over time (e.g., based on ranking updates, offset user activity, user responsiveness to search results, etc.).

An example operation, for example to classify queries, determine query intents, classify sources, or the like, includes providing all relevant features in a string to perform such operations. An example operation includes combining the results into a single useful answer, including coupling elements together into a flow for the answer, ensuring grammatical correctness, and/or providing citations. An example embodiment is configured to determine the presence of machine generated content, for example within a source, and/or determining that an entire source is constituted from machine generated content (e.g., generative artificial intelligence (GenAI) content or the like). In certain embodiments, sources and/or elements thereof that are determined to be machine generated content may be flagged, allowing for rapid decisions related to the machine generated content during various operations herein. In certain embodiments, machine generated content may be deprecated (e.g., given a lower ranking, and/or disfavored versus user generated content), blocked (e.g., not utilized to formulate an answer), and/or treated according to user preferences. In example embodiments, machine generated content may be utilized directly in the same manner as other content. For example, machine generated content may be utilized in an answer, and flagged for the convenient reference of the user that the content appears to be machine generated.

According to examples, determination of potential machine generated content, and how it may be utilized or not, may be combined with other determinations, for example, the machine generated content may be utilized where it is expected that the content may be machine generated initially (e.g., reports, listings, data sets, etc.) and/or where the source is otherwise of a high quality (e.g., provided by a university or expert in the field of the query) and would be expected to be correct. In examples, responses of users over time to certain machine generated content elements may be utilized to determine whether the machine generated content should be used or not, for example based on responses of users to searches including the content. The detection, flagging, and/or management of machine generated content can avoid recursive information loops, where the machine generated content is not a primary source of information but effectively gets used as such, while still allowing the use of the content where it would be helpful to specific users for specific purposes.

In example embodiments, some types of user generated content are treated with additional care and management. For example, discussion threads, REDDIT sources, QUORA sources, or the like, may include good sourcing information as answers for certain query types. However, user generated content sources such as these can be subject to thread drift, off-topic discussion, and/or repetition that may inflate the weight of the source. Accordingly, embodiments herein may be configured to parse and/or classify such user generated content, for example to identify (and/or exclude) off-topic content, to tune the weighting of the source appropriately, to identify content that may be valuable for some purpose other than the thread topic (e.g., capturing a good description of bat echo-location provided off-topic in a thread about whales), or the like. Portions of such content may be treated as separate standalone sources, at least for determinations of relevant sources, source ranking against the search query, or the like. Determinations of trust values, ranking, and/or classification may further include considerations of the user (e.g., which REDDIT user provided content), the source (e.g., REDDIT, QUORA, WIKIPEDIA discussion page, internal discussion page for a company, etc.), the topic (e.g., an on-topic comment may be given a higher ranking than an off-topic comment), query type (e.g., a casual intent query may drive a different parsing and/or treatment for such content relative to an academic intent query), the history of the specific user with such content, a classification of the user, meta-data from the source (e.g., number of likes, dislikes, reports, etc. associated with a comment), and/or a combination of these (e.g., User A commenting on Thread B is treated as source AB, and user A commenting on Thread C is treated as source AC, embodying the potential differential ranking of that user by topic, etc.).

In example embodiments, content may have an adjusted ranking, relevance, trust level, etc., based on the information type and/or age of the information. For example, a source dated before a new scientific discovery may be rated lower than a source dated after the scientific discovery, where the topic of the search query relates to that scientific discovery. Without limitation, other aging data types include news or current events, financial information, politics, etc. Metadata changes over time may be considered as well, for example where content is recently edited, where a ratio of likes/dislikes changes after a relevant event (e.g., content about a company that receives a large number of dislikes after the company reports financial data may be an indicator that the trust level of that content has changed). Source information that is likely to be time sensitive may be flagged, determined according to classification information, determined by an inflection in responses, etc.

In the illustrative example, FIG. 3 corresponds to an Internet browser user interface displayed on the user device 104 (e.g., a laptop) or other device of another user. While Internet browser user interfaces are discussed in the illustrated examples, it is appreciated that the user interfaces can similarly be integrated into other applications, such as native applications of a client device operating system (e.g., a mobile application on a smartphone, a Linux application on a Linux laptop, windows application on a Windows enabled laptop, etc.).

Figure 4:
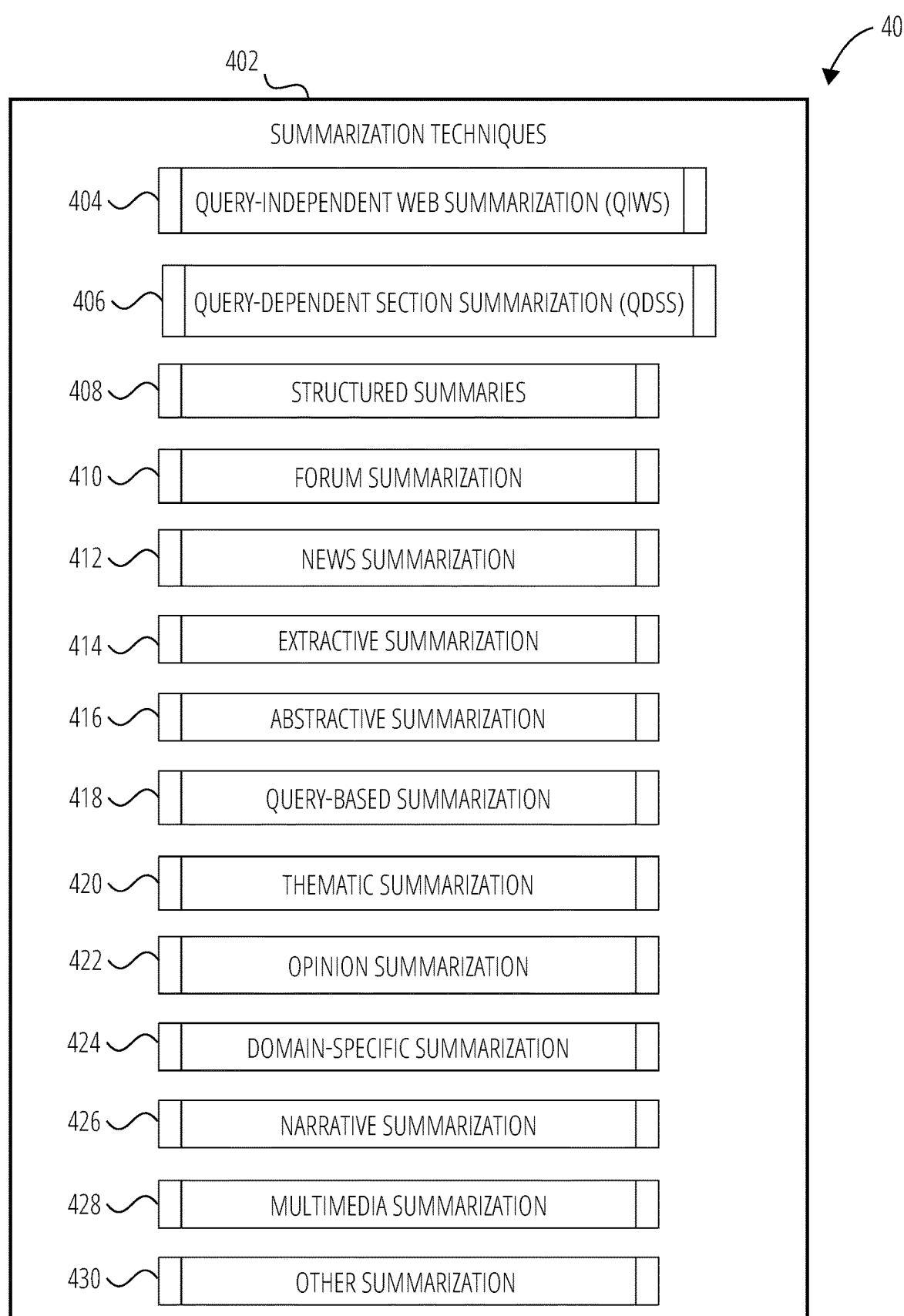
FIG. 4 is a block diagram illustrating a series of summarization techniques, according to some example embodiments.

FIG. 4 is an example block diagram 400 illustrating a series of summarization techniques 402, in accordance with some embodiments of the present disclosure.

Example embodiments of the enhanced summarization system employs a suite of summarization techniques, each meticulously designed for different types of content. For example, these techniques can include Query-Independent Web Summarization (QIWS) 404, Query-Dependent Section Summarization (QDSS) 406, structured summaries 408, forum summarization 410, news summarization 412, extractive summarization 414, abstractive summarization 416, query-based summarization 418, thematic summarization 420, opinion summarization 422, domain-specific summarization 424, narrative summarization 426, multimedia summarization 428, or other summarization 430 techniques. The different summarization techniques can be used alone or in combination according to examples of the present disclosure incorporated into a multi-document summarization to generate an answer to a user's query.

For example, a structured summary 408 technique can be used for domain-specific pages, such as product listings or movie databases, the system extracts structured information to provide a summary that includes key details like ratings, reviews, and specifications. A forum summarization 410 technique can be applied to forum threads, particularly on platforms like Reddit, to distill the most pertinent discussions and viewpoints into a coherent summary. News summarization 412 techniques, given the information-dense nature of news articles, emphasize summarizing the lead sections while preserving the article's core message and facts. Extractive summarization 414 techniques include selecting and extracting phrases, sentences, or paragraphs directly from the source document to create a summary. The chosen segments are those that best represent the main points of the text. Extractive summarization does not alter the original text but rather compiles the most informative parts. Abstractive summarization 416 technique goes beyond extraction to generate new phrases and sentences that capture the essence of the source content. This method requires a deeper understanding of the text and the ability to express its meaning with new expressions, often resembling how a human would summarize information.

Other example summarization techniques include query-based summarization 418, which tailors the summary to answer a specific query or set of queries. It focuses on extracting or generating information from the document that is most relevant to the user's search intent. Thematic summarization 420 technique identifies the central themes or topics within a document and creates a summary that covers these key themes, providing a broad overview of the content's subject matter. Opinion summarization 422 technique is often used for reviews and feedback, opinion summarization aggregates and presents the sentiments or viewpoints expressed in the text, giving readers a summary of the overall opinions. Domain-specific summarization 424 technique can be tailored to specific fields such as legal, medical, or scientific texts. Domain-specific summarization incorporates specialized knowledge to create summaries that are meaningful within the context of the field. Narrative summarization 426 technique focuses on summarizing stories or events by identifying and presenting the narrative elements, such as the plot, characters, and setting, in a condensed form. Multimedia summarization 428 technique is applicable to content like videos, images, and audio. Multimedia summarization involves creating a condensed version of the media, such as a highlight reel or a visual abstract, which captures the main points or moments.

Figure 5:
FIG. 5 is a block diagram illustrating components of a retrieval-augmented generation system, according to some example embodiments.

FIG. 5 is an example block diagram 500 illustrating an example retrieval-augmented generation (RAG) system 502, in accordance with some embodiments of the present disclosure.

Example embodiments of the multi-document summarization system provide a personalized, digestible, and comprehensive information compression and generation method using large language models to handle user queries by providing one answer as output for the user query that combines and cites multiple documents sources with single-turn and multi-turn capabilities. The multi-document summarization system when combined with the RAG system 502 uses the power of pre-trained language models with a retrieval system. It retrieves documents relevant to a query and then uses multiple language models to generate responses based on both the query and the retrieved documents.

The block diagram 500 illustrates components of the retrieval-augmented generation system 502 including a results component 508, a per-document summarization component 510, a question-answering models component 512, a cross-document citation component 514, cross-document attributed summarization component 516, and a unified Generative Artificial Intelligence (GenAI) component 518.

The results component 508 enables the multi-document summarization system 242 to retrieve documents associated with a user query. Any number of documents can be retrieved and/or ranked according to the retrieval-augmented generation system 502, for example, tens of documents or hundreds of documents, depending on pre-defined settings or GenAI based document settings. Once all documents are received, example embodiments of the multi-document summarization system 242 consist of two phases of retrieval-augmented generation using LLMs, including phase 1 being a per-document summarization and question-answering models summarization technique and phase 2 being a cross-document attributed summarization technique for summarizing the summaries.

According to example embodiments of the present disclosure Query-Independent Web Summarization (QIWS) and Query-Dependent Section Summarization (QDSS) techniques are used in phases to generate a multi-document summarization formatted as a final output (e.g., answer) to the user's query with citations that is presented in the user interface of the user's web browser.

At phase 1, the per-document summarization component 510 employs QIWS, or web document summarization, generates a concise summary of a web page's content, independent of any user query, focusing on capturing the essence of the information presented. The QIWS can be aimed at general web documents as an abstractive task to, for example, compress a 500-900-word page into a 50-70-word summary using, for example, encoder-decoder models. For example, the Query-Independent Web Summarization component autonomously generates a concise representation of a web document's content without the influence of a specific user query.

Additionally at phase 1, the question-answering model component 512 employs advanced natural language processing algorithms to analyze the intrinsic value of the document's text, identifying and extracting pivotal sections that encapsulate the core themes and salient points. The objective is to distill the essence of the document into an abstract or snippet that provides a general overview, facilitating a preliminary understanding for users and enhancing the document's accessibility within a search engine's indexing system. By implementing this summarization technique, the enhanced summarization system offers a streamlined approach to content digestion, enabling users to rapidly gauge the relevance of web pages in a broader context, independent of individual search intents or inquiries. Examples of the question-answering model component 512 are designed to process and interpret natural language queries posed by users. These models utilize advanced algorithms and machine learning techniques to comprehend the intent behind a user's question, retrieve relevant information from a vast corpus of data, and generate accurate, contextually appropriate responses. The models are trained on diverse datasets to handle a wide range of question types, from fact-based inquiries to complex, analytical questions requiring deep understanding and synthesis of multiple information sources. Through iterative learning and optimization, these question-answering models continually improve their performance, accuracy, and reliability in delivering precise answers to users' queries. Additional details on machine learning techniques as used herein are in patent application entitled, "Enhanced Searching Using Fine-Tuned Machine Learning Models," filed concurrently on Feb. 16, 2024, U.S. patent application Ser. No. 18/444,078, hereby incorporated by reference in its entirety.

At phase 2, the cross-document citation component 514 enables cross document summarization to be performed by referencing and attributing specific pieces of information in a summary to their original sources across multiple documents. This process involves identifying pertinent information from a collection of documents and then accurately linking each piece of summarized content back to the respective document from which it was derived. Cross-document citation is crucial for maintaining the credibility of the summarized information, allowing users to trace the origin of each fact or statement, and ensuring that the intellectual property rights of the original content creators are respected. In some examples, cross-document citation may involve the use of unique identifiers for each source document, such as URLs, Digital Object Identifiers (DOIs), or database record numbers. The system would then embed these identifiers within the generated summary, either as hyperlinks, footnotes, endnotes, or parenthetical references, depending on the format and requirements of the output. The implementation of cross-document citation is a key feature that enhances the transparency and verifiability of automatically generated summaries, particularly in academic, research, and professional contexts where source validation is paramount.

Phase 2 further includes the cross-document attributed summarization component 516 that enables the generation of a summarization of the individual summaries using a systematic approach to distill a cohesive summary from an aggregation of documents, with an emphasis on maintaining explicit linkages to the source materials. The technique used by the cross-document attributed summarization component 516 amalgamates salient information from a spectrum of texts into a singular, consolidated abstract that encapsulates the core theme or inquiry at hand. A distinctive feature of this method is the meticulous attribution of each segment of the summary to its originating document, facilitated through various citation mechanisms such as hyperlinks or footnotes, thereby preserving the traceability of information.

Last, the unified Gen-AI component 518 of the retrieval-augmented generation system 502 recognizes and excludes duplicative content, ensuring the uniqueness and clarity of the synthesized summary. It also guarantees the preservation of the original context, allowing for a seamless integration of information derived from disparate sources. Scalability is a cornerstone of this approach, enabling the efficient summarization of extensive document collections. This form of summarization proves invaluable in contexts demanding rapid assimilation of widespread information, such as synthesizing literature reviews, conducting research analyses, or generating comprehensive reports, all while upholding the integrity of the source material for subsequent scrutiny or corroboration. The unified Gen-AI component 518 combines summaries from different sources into a final global summary that is provided as output to the user's query as a single, unified answer.

Additional examples of the RAG system 502 employ task-specific generative models to leverage problem structure. For example, if a task includes web document summarization (e.g., QIWS), then the system generates an abstractive summary given a web document. In another example, if a task involves cross-document cited summarization, then the system composes a single cited cross-document summary across all documents given a user query and a list of ranked per-document abstractive summaries. If a task involves long form content, then the system breaks up the long form content into sections and summarizes each section.

Example embodiments provide for handling challenges with cross document summaries, such as the issue of how to handle multiple intents coming from different web pages (referred to as "franken-clusters" or "franken summaries"). Examples of cross document summarization of the multi-document summarization system presented herein provides for the amalgamation of unrelated information due to ambiguous queries by implementing sophisticated disambiguation algorithms. Examples further ensure freshness of information by guaranteeing that the summarized content reflects the most current data available, for example, by combining information from a source at different points in time.

In additional examples, Query-Independents Web Sectioned Summaries (QIWSS) can be aimed at articles or long form content in documents or web documents, where QIWSS is even more abstractive than QIWS often due to input size. QDSS is tailored to user queries and summarizes specific sections of a web page that are most relevant to the user's search intent. The RAG system can employ and train any number of task-specific generative models to be used on specific types of documents (e.g., long form content, forums, news, etc.).

FIG. 6 illustrates a flow diagram of a method 600 for enabling users to provide a query to a web browser and receive a single unified answer in the form of a summarized text including citations presented within the web browser, in accordance with some example embodiments. The method 600 can be embodied in machine-readable instructions for execution by one or more hardware components (e.g., one or more processors, one or more hardware processors) such that the operations of the method 600 can be performed by components of the systems depicted in FIG. 1, FIG. 2, and/or FIG. 11, such as a web browser of the user device 104. Accordingly, the method 600 is described below, by way of example with reference to components of the user device 104. However, it shall be appreciated that method 600 can be deployed on various other hardware configurations and is not intended to be limited to deployment within the hardware of examples presented herein.

Depending on the example embodiment, an operation of the method 600 can be repeated in different ways or involve intervening operations not shown. Though the operations of the method 600 can be depicted and described in a certain order, the order in which the operations are performed may vary among embodiments, including performing certain operations in parallel or performing sets of operations in separate processes. While the various operations in this flowchart are presented and described sequentially, one of ordinary skill will appreciate that some or all of the operations may be executed in a different order, be combined or omitted, or be executed in parallel.

In block 602, the method 600 receives, from a user device, a search query. In block 604, the method 600 retrieves a plurality of search result documents based on the search query. In block 606, the method 600 generates a summary of each of the plurality of search result documents using distinct per-document summarization machine learning models. According to some examples, the distinct per-document summarization machine learning models have been fine-tuned using a training dataset automatically created by prompting a large language model. In block 608, the method 600 synthesizes the summary of each of the plurality of search result documents into a single-consolidated answer responsive to the received search query from the user device. In block 610, the method 600 formats the consolidated answer to include citations to the plurality of search results documents.

For example, the method 600 can include a multi-turn disambiguation personalization technique incorporating the following steps:

1. A user inputs a query that is ambiguous or has multiple potential interpretations.
2. The system, recognizing the ambiguity, asks a follow-up question to gather more context or clarification.
3. The user provides additional information, which the system uses to refine its understanding of the query.
4. Steps 2 and 3 may repeat as necessary until the system has enough information to provide a personalized and accurate response.
5. The system delivers a response that is both disambiguated and personalized, taking into account the user's clarified intent and any known preferences or past interactions.
6. The system formats a single-consolidated answer that includes citations to each of the relevant used information and presents the singular answer to the user.

This approach is particularly important in complex domains where queries may be inherently ambiguous, and user satisfaction depends on the system's ability to interact naturally and adapt to individual users' needs.

An additional example of the method 600 can include the system receiving input from a user, for example, a user may provide a query to the multi-document summarization system. The input is received by a multi-turn disambiguation personalization component of the multi-document summarization system, which in turn provides the input query to one or more LLM ranking and retrieval models for processing. Once processed by one or more models, a first iteration of a summary is passed to a per-document summarization layer to generate a summary on a per-document basis. Once each per-document summary is completed, the output is passed to a cited multi-document summarization layer to generate a complete single retrieval-augmented generated summary that includes a compilation of cited sources. The retrieval-augmented generated summary is passed as output back to the user as an answer to the user's initial query.

Another general aspect is for a system that includes a memory comprising instructions and one or more computer processors. The instructions, when executed by the one or more computer processors, cause the one or more computer processors to perform operations. In yet another general aspect, a tangible machine-readable storage medium (e.g., a non-transitory storage medium) includes instructions that, when executed by a machine, cause the machine to perform operations.

Described implementations of the subject matter can include one or more features, alone or in combination as illustrated below by way of example.

Example 1 is a system comprising: one or more hardware processors of a machine; and at least one memory storing instructions that, when executed by the one or more hardware processors, cause the system to perform operations comprising: receiving a search query; retrieving, by at least one hardware processor, a plurality of search result documents based on the search query; generating a summary of each of the plurality of search result documents using distinct per-document summarization machine learning models, the distinct per-document summarization machine learning models using a training dataset; synthesizing the summary of each of the plurality of search result documents into a single-consolidated answer responsive to the received search query; and formatting the single-consolidated answer to include, citations to the plurality of search result documents.

In Example 2, the subject matter of Example 1 includes, the operations comprising: identifying a set of documents from the plurality of search result documents pertinent to a subject of the search query; employing a machine learning model to discern particular content within the identified set of documents; and identifying common particular content across the plurality of search result documents.

In Example 3, the subject matter of Example 2 includes, the operations comprising: selecting a representative sentence from the plurality of search result document summaries for each of the identified common particular content.

In Example 4, the subject matter of Example 3 includes, the operations comprising: combining multiple selected representative sentences for each of the identified common particular content into the single-consolidated answer.

In Example 5, the subject matter of Examples 1-4 includes, wherein summarization of multiple documents is performed using a hierarchical approach, first summarizing individual sections within each document and second summarizing collective sections to form the single-consolidated answer.

In Example 6, the subject matter of Examples 1-5 includes, the operations comprising: identifying, in an automatic manner, a citation for source documents for extracted information; and embedding a hyperlink to the citation within the single-consolidated answer at a location corresponding to the extracted information.

In Example 7, the subject matter of Examples 1-6 includes, the operations comprising: performing real-time updates to the search query based on detection of new information relevant to the search query, wherein the real-time updates are incorporated into the single-consolidated answer without user intervention.

In Example 8, the subject matter of Examples 1-7 includes, the operations comprising: supporting multi-turn disambiguation by presenting a set of follow-up questions to a user based on the single-consolidated answer; receiving user responses to the set of follow-up questions; and refining the single-consolidated answer based on the user responses to the set of follow-up questions.

In Example 9, the subject matter of Examples 1-8 includes, the operations comprising: presenting, via a web browser on a user device, the single-consolidated answer; and receiving user input for query refinement, wherein the single-consolidated answer is dynamically updated based on the user input for the query refinement.

In Example 10, the subject matter of Examples 1-9 includes, the operations comprising: utilizing one or more asymmetric compression techniques to reduce computational resources utilization by the machine learning models, enabling summarization scaling capabilities to handle concurrent user queries.

Example 11 is a method comprising: receiving a search query; retrieving, by at least one hardware processor, a plurality of search result documents based on the search query; generating a summary of each of the plurality of search result documents using distinct per-document summarization machine learning models, the distinct per-document summarization machine learning models using a training dataset; synthesizing the summary of each of the plurality of search result documents into a single-consolidated answer responsive to the received search query; and formatting the single-consolidated answer to include, citations to the plurality of search result documents.

In Example 12, the subject matter of Example 11 includes, identifying a set of documents from the plurality of search result documents pertinent to a subject of the search query; employing a machine learning model to discern particular content within the identified set of documents; and identifying common particular content across the plurality of search result documents.

In Example 13, the subject matter of Example 12 includes, selecting a representative sentence from the plurality of search result document summaries for each of the identified common particular content.

In Example 14, the subject matter of Example 13 includes, combining multiple selected representative sentence for each of the identified common particular content into the single-consolidated answer.

In Example 15, the subject matter of Examples 11-14 includes, wherein summarization of multiple documents is performed using a hierarchical approach, first summarizing individual sections within each document and second summarizing collective sections to form the single-consolidated answer.

In Example 16, the subject matter of Examples 11-15 includes, identifying, in an automatic manner, a citation for source documents for extracted information; and embedding a hyperlink to the citation within the single-consolidated answer at a location corresponding to the extracted information.

In Example 17, the subject matter of Examples 11-16 includes, performing real-time updates to the search query based on detection of new information relevant to the search query, wherein the real-time updates are incorporated into the single-consolidated answer without user intervention.

In Example 18, the subject matter of Examples 11-17 includes, supporting multi-turn disambiguation by presenting a set of follow-up questions to a user based on the single-consolidated answer; receiving user responses to the set of follow-up questions; and refining the single-consolidated answer based on the user responses to the set of follow-up questions.

In Example 19, the subject matter of Examples 11-18 includes, presenting, via a web browser on a user device, the single-consolidated answer; and receiving user input for query refinement, wherein the single-consolidated answer is dynamically updated based on the user input for the query refinement.

In Example 20, the subject matter of Examples 11-19 includes, utilizing one or more asymmetric compression techniques to reduce computational resources utilization by the machine learning models, enabling summarization scaling capabilities to handle concurrent user queries.

Example 21 is a machine-storage medium embodying instructions that, when executed by a machine, cause the machine to perform operations comprising: receiving a search query; retrieving, by at least one hardware processor, a plurality of search result documents based on the search query; generating a summary of each of the plurality of search result documents using distinct per-document summarization machine learning models, the distinct per-document summarization machine learning models using a training dataset; synthesizing the summary of each of the plurality of search result documents into a single-consolidated answer responsive to the received search query; and formatting the single-consolidated answer to include, citations to the plurality of search result documents.

In Example 22, the subject matter of Example 21 includes, wherein the operations comprise: identifying a set of documents from the plurality of search result documents pertinent to a subject of the search query; employing a machine learning model to discern particular content within the identified set of documents; and identifying common particular content across the plurality of search result documents.

In Example 23, the subject matter of Example 22 includes, wherein the operations comprise: selecting a representative sentence from the plurality of search result document summaries for each of the identified common particular content.

In Example 24, the subject matter of Example 23 includes, wherein the operations comprise: combining multiple selected representative sentence for each of the identified common particular content into the single-consolidated answer.

In Example 25, the subject matter of Examples 21-24 includes, wherein summarization of multiple documents is performed using a hierarchical approach, first summarizing individual sections within each document and second summarizing collective sections to form the single-consolidated answer.

In Example 26, the subject matter of Examples 21-25 includes, wherein the operations comprise: identifying, in an automatic manner, a citation for source documents for extracted information; and embedding a hyperlink to the citation within the single-consolidated answer at a location corresponding to the extracted information.

In Example 27, the subject matter of Examples 21-26 includes, wherein the operations comprise: performing real-time updates to the search query based on detection of new information relevant to the search query, wherein the real-time updates are incorporated into the single-consolidated answer without user intervention.

In Example 28, the subject matter of Examples 21-27 includes, wherein the operations comprise: supporting multi-turn disambiguation by presenting a set of follow-up questions to a user based on the single-consolidated answer; receiving user responses to the set of follow-up questions; and refining the single-consolidated answer based on the user responses to the set of follow-up questions.

In Example 29, the subject matter of Examples 21-28 includes, wherein the operations comprise: presenting, via a web browser on a user device, the single-consolidated answer; and receiving user input for query refinement, wherein the single-consolidated answer is dynamically updated based on the user input for the query refinement.

In Example 30, the subject matter of Examples 21-29 includes, wherein the operations comprise: utilizing one or more asymmetric compression techniques to reduce computational resources utilization by the machine learning models, enabling summarization scaling capabilities to handle concurrent user queries.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

FIG. 7 depicts a machine-learning pipeline 700 and FIG. 7 illustrates training and use of a machine-learning program (e.g., model) 800. Specifically, FIG. 7 is a flowchart depicting a machine-learning pipeline 700, according to some examples. The machine-learning pipeline 700 can be used to generate a trained model, for example the trained machine-learning program 802 of FIG. 8, to perform operations associated with searches and query responses.

Broadly, machine learning may involve using computer algorithms to automatically learn patterns and relationships in data, potentially without the need for explicit programming. Machine learning algorithms can be divided into three main categories: supervised learning, unsupervised learning, self-supervised, and reinforcement learning.

For example, supervised learning involves training a model using labeled data to predict an output for new, unseen inputs. Examples of supervised learning algorithms include linear regression, decision trees, and neural networks. Unsupervised learning involves training a model on unlabeled data to find hidden patterns and relationships in the data. Examples of unsupervised learning algorithms include clustering, principal component analysis, and generative models like autoencoders. Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions.

Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (e.g., is this object an apple or an orange?). Regression algorithms aim at quantifying some items (for example, by providing a value that is a real number).

Figure 8:
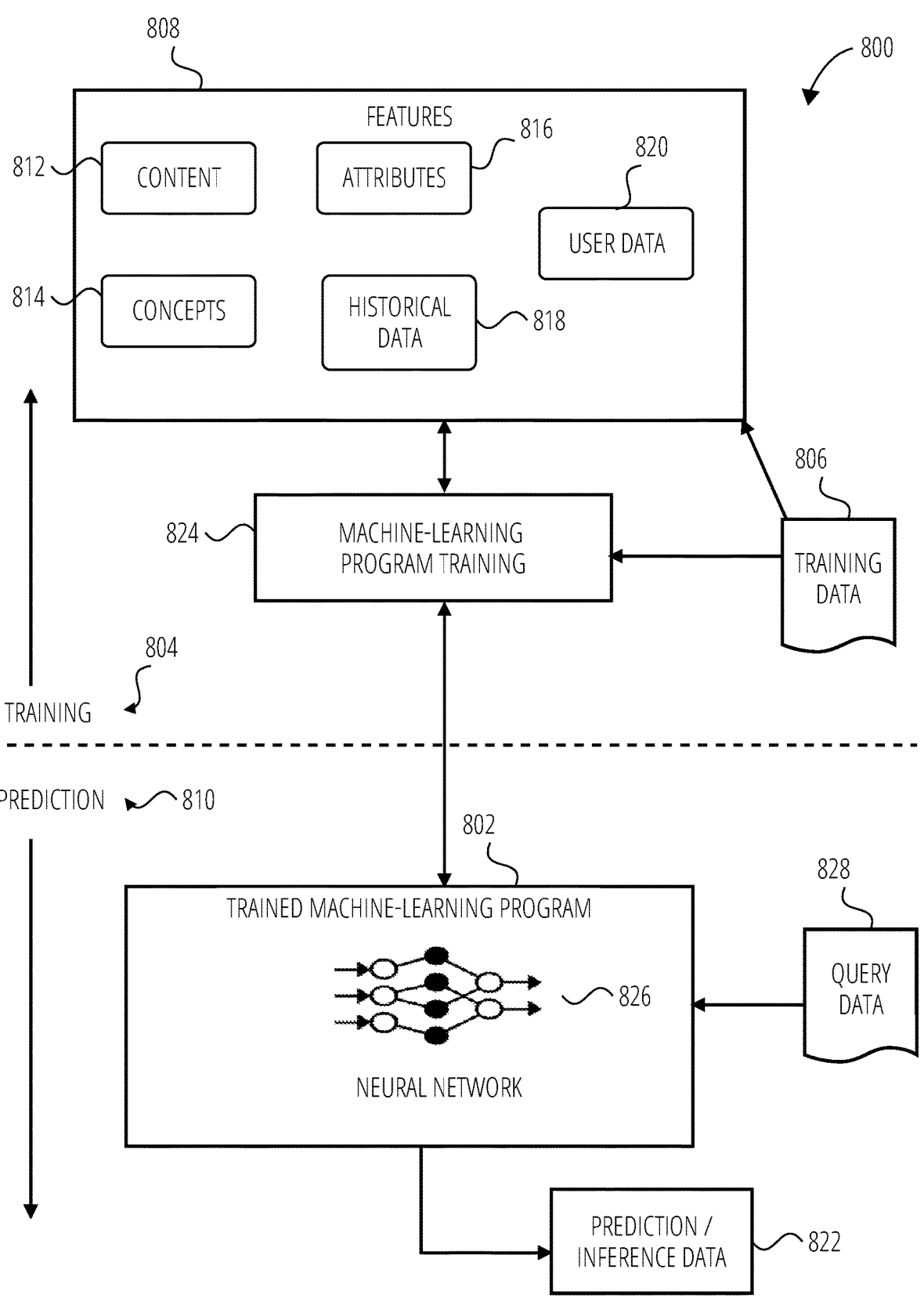
FIG. 8 is a data flow diagram illustrating training and use of a machine-learning program, according to some example embodiments.

Turning to the training phases 804 as described and depicted in connection with FIG. 8, generating a trained machine-learning program 802 may include multiple phases that form part of the machine-learning pipeline 700, including for example the following phases illustrated in FIG. 7: data collection and preprocessing 702, feature engineering 704, model selection and training 706, model evaluation 708, prediction 710, validation, refinement, or retraining 712, and deployment 714, or a combination thereof.

For example, data collection and preprocessing 702 can include a phase for acquiring and cleaning data to ensure that it is suitable for use in the machine learning model. This phase may also include removing duplicates, handling missing values, and converting data into a suitable format.

Feature engineering 704 can include a phase for selecting and transforming the training data 806 to create features that are useful for predicting the target variable. Feature engineering may include (1) receiving features 808 (e.g., as structured or labeled data in supervised learning) and/or (2) identifying features 808 (e.g., unstructured, or unlabeled data for unsupervised learning) in training data 806. Model selection and training 706 can include a phase for selecting an appropriate machine learning algorithm and training it on the preprocessed data. This phase may further involve splitting the data into training and testing sets, using cross-validation to evaluate the model, and tuning hyperparameters to improve performance.

In additional examples, model evaluation 708 can include a phase for evaluating the performance of a trained model (e.g., the trained machine-learning program 802) on a separate testing dataset. This phase can help determine if the model is overfitting or underfitting and determine whether the model is suitable for deployment. Prediction phase 810 includes using a trained model (e.g., trained machine-learning program 802) to generate predictions on new, unseen data. Validation, refinement or retraining 712 can include a phase for updating a model based on feedback generated from the prediction phase, such as new data or user feedback. Deployment 714 can include a phase for integrating the trained model (e.g., the trained machine-learning program 802) into a more extensive system or application, such as a web service, mobile app, or IoT device. This phase can involve setting up APIs, building a user interface, and ensuring that the model is scalable and can handle large volumes of data.

FIG. 8 illustrates further details of two example phases, namely a training phase 804 (e.g., part of the model selection and training 706) and a prediction phase 810 (part of prediction 710). Prior to the training phase 804, feature engineering 704 is used to identify features 808. This may include identifying informative, discriminating, and independent features for effectively operating the trained machine-learning program 802 in pattern recognition, classification, and regression. In some examples, the training data 806 includes labeled data, known for pre-identified features 808 and one or more outcomes. Each of the features 808 may be a variable or attribute, such as an individual measurable property of a process, article, system, or phenomenon represented by a data set (e.g., the training data 806). Features 808 may also be of different types, such as numeric features, strings, and graphs, and may include one or more of content 812, concepts 814, attributes 816, historical data 818, and/or user data 820, merely for example and not limitation.

In training phase 804, the machine-learning pipeline 700 uses the training data 806 to find correlations among the features 808 that affect a predicted outcome or prediction/inference data 822.

With the training data 806 and the identified features 808, the trained machine-learning program 802 is trained during the training phase 804 during machine-learning program training 824. The machine-learning program training 824 appraises values of the features 808 as they correlate to the training data 806. The result of the training is the trained machine-learning program 802 (e.g., a trained or learned model).

Further, the training phase 804 may involve machine learning, in which the training data 806 is structured (e.g., labeled during preprocessing operations). The trained machine-learning program 802 implements a neural network 826 capable of performing, for example, classification and clustering operations. In other examples, the training phase 804 may involve deep learning, in which the training data 806 is unstructured, and the trained machine-learning program 802 implements a deep neural network 826 that can perform both feature extraction and classification/clustering operations.

In some examples, a neural network 826 may be generated during the training phase 804 and implemented within the trained machine-learning program 802. The neural network 826 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 826 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 826 may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 804, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In prediction phase 810, the trained machine-learning program 802 uses the features 808 for analyzing query data 828 to generate inferences, outcomes, or predictions, as examples of a prediction/inference data 822. For example, during prediction phase 810, the trained machine-learning program 802 generates an output. Query data 828 is provided as an input to the trained machine-learning program 802, and the trained machine-learning program 802 generates the prediction/inference data 822 as output, responsive to receipt of the query data 828.

In some examples, the trained machine-learning program 802 may be a generative AI model. Generative AI is a term that may refer to any type of artificial intelligence that can create new content from training data 806. For example, generative AI can produce text, images, video, audio, code, or synthetic data similar to the original data but not identical.

Some of the techniques that may be used in generative AI are: Convolutional Neural Networks, Recurrent Neural Networks, generative adversarial networks, variational autoencoders, transformer models, and the like. For example, Convolutional Neural Networks (CNNs) can be used for image recognition and computer vision tasks. CNNs may, for example, be designed to extract features from images by using filters or kernels that scan the input image and highlight important patterns. Recurrent Neural Networks (RNNs) can be used for processing sequential data, such as speech, text, and time series data, for example. RNNs employ feedback loops that allow them to capture temporal dependencies and remember past inputs. Generative adversarial networks (GANs) can include two neural networks: a generator and a discriminator. The generator network attempts to create realistic content that can "fool" the discriminator network, while the discriminator network attempts to distinguish between real and fake content. The generator and discriminator networks compete with each other and improve over time. Variational autoencoders (VAEs) can encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies. Transformer models can use attention mechanisms to learn the relationships between different parts of input data (such as words or pixels) and generate output data based on these relationships. Transformer models can handle sequential data, such as text or speech, as well as non-sequential data, such as images or code. In generative AI examples, the output prediction/inference data 822 can include predictions, translations, summaries, media content, and the like, or some combination thereof.

In some example embodiments, computer-readable files come in several varieties, including unstructured files, semi-structured files, and structured files. These terms may mean different things to different people. Examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data.

As used herein, examples of unstructured files include image files, video files, PDFs, audio files, and the like; examples of semi-structured files include JavaScript Object Notation (JSON) files, extensible Markup Language (XML) files, and the like. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

Figure 9:
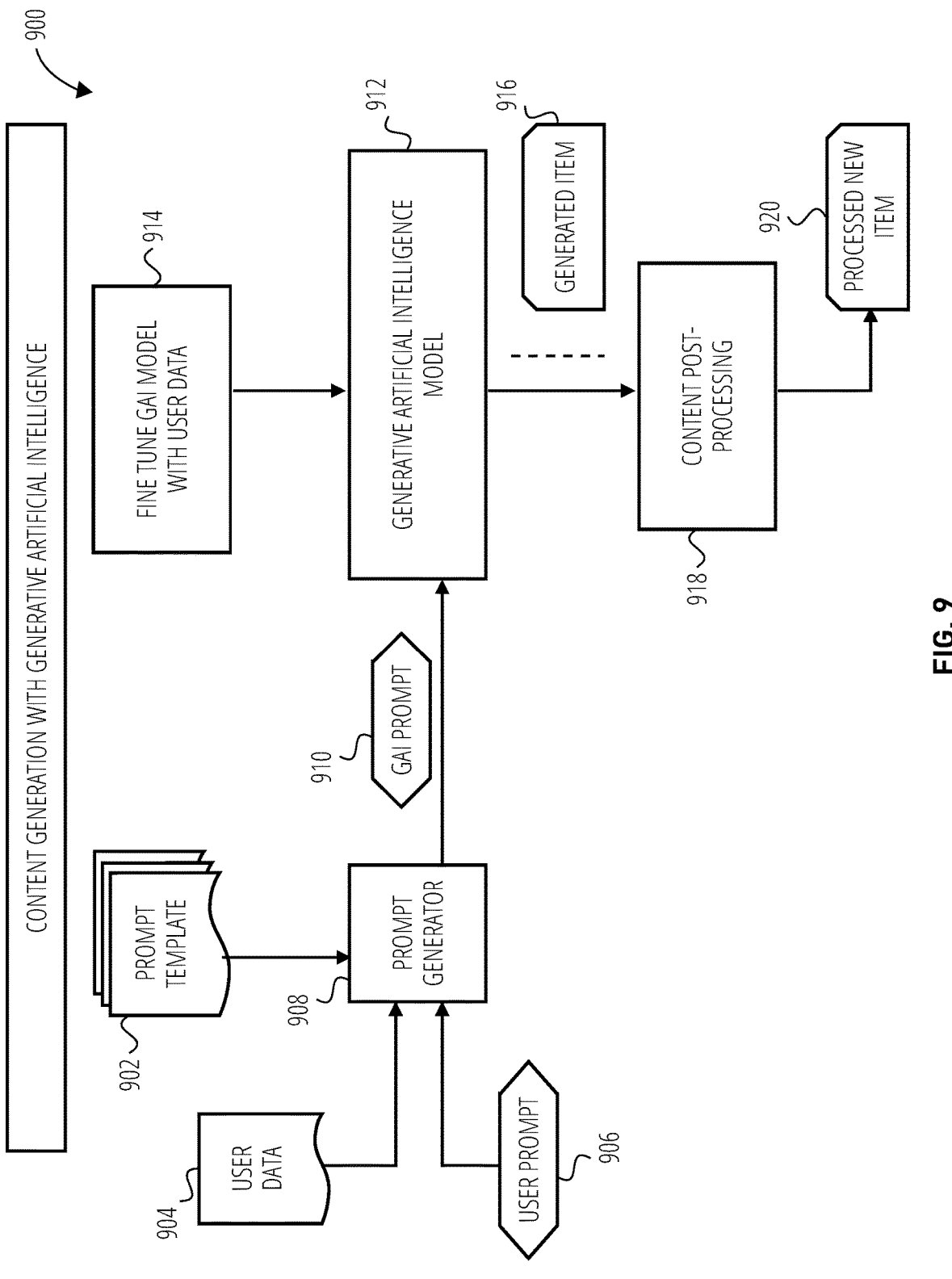
FIG. 9 is a data flow diagram illustrating content generation with generative artificial intelligence, according to some example embodiments.

FIG. 9 illustrates a block diagram 900 employing the use of a Generative Artificial Intelligence (GAI) model 912 to generate new content, according to some examples. GAI is a type of AI that can generate new content, such as images, text, video, or audio. The GAI model 912 is trained on large datasets of data and uses this data to learn the patterns and relationships between different elements of the data. There are several types of GAI models, such as Generative Adversarial networks (GANs), Variational Autoencoders (VAEs), and Autoregressive models.

The GAI models generate items of different types, such as GAI models for creating text (e.g., GPT-4, Pathways Language Model 2 (PaLM 2), LaMDA), images (e.g., DALL-E2, Stable Diffusion), videos (Runway Gen-2, Stable Diffusion Video), audio (e.g., Google MusicLM, Stable Audio), etc.

Often, the companies that create the GAI models make the GAI models available to users who can apply them to generate the desired content based on a GAI prompt 910 provided to the GAI model 912. Users can utilize the GAI model 912 as provided by the vendor or can optionally fine-tune 914 the GAI model 912 with their user data to adjust the parameters of the GAI model 912 in order to improve performance on a specific task or domain.

In some examples, fine-tuning the GAI model 912 includes the following operations: 1. Collect user data: Gather a collection of user data that is relevant to the target task or domain. This data could include text, images, audio, or other types of data; 2. Label the data: if the task requires supervised learning, the user data is labeled with the correct outputs; 3. Select a fine-tuning method. Some of the methods for fine-tuning GAI models include Full fine-tuning, Few-shot fine-tuning, and Prompt-based fine-tuning; 4. Train the GAI model 912: Perform incremental training of the tune 914 using the selected fine-tuning method; and 5. Optionally, evaluate the performance of the fine-tuned model on a held-out dataset.

The GAI model 912 can be used to generate new content based on the GAI prompt 910 used as input, and the GAI model 912 creates a newly generated item 916 as output.

The GAI prompt 910 is a piece of text or code that is used to instruct the GAI model 912 towards generating a desired output (e.g., generated item 916). The GAI prompt 910 provides context, instructions, and expectations for the output. The newly generated item 916 may be multi-modal, such as a piece of text, an image, a video, an audio, a piece of programming code, etc., or a combination thereof.

Prompt engineering is the process of designing and crafting prompts to effectively instruct and guide a GAI model toward generating desired outputs. It involves selecting and structuring the text that forms the GAI prompt 910 input to the GAI model 912, ensuring that the GAI prompt 910 accurately conveys the task, context, and desired style of the output.

A prompt generator 908 is a computer program that generates the GAI prompt 910. There are several ways to generate the GAI prompt 910. In one example, the prompt generator 908 may use a user prompt 906 entered by the user in plain language as the GAI prompt 910. In other examples, the prompt generator 908 creates the GAI prompt 910 without having a user prompt 906, such as by using a static pre-generated prompt based on the desired output.

In other examples, the prompt generator 908 uses a prompt template 902 to generate the GAI prompt 910. The prompt template 902 defines the structure of the GAI prompt 910 and may include fields that may be filled in based on available information to generate the GAI prompt, such as user data 904 or the user prompt 906. The prompt template may also include rules for the creating of the GAI prompt (e.g., include specific text when the recipient resides in California, but do not include the text if the recipient does not reside in California). In other examples, the prompt generator 908 uses heuristics codified into a computer program to generate the GAI prompt 910.

After the generated item 916 is generated, an optional operation of content postprocessing 918 may be performed to modify or block the newly generated item 916, resulting in a processed new item 920. The generated item 916 may be post-processed for various reasons, including improving accuracy and consistency (e.g., checking for factual errors, grammatical mistakes, or inconsistencies in style or format); enhancing quality and relevance (e.g., remove irrelevant or redundant content, improve coherence and flow, ensure that the output aligns with the intended purpose); enhancing output (e.g., polish wording, improve images, ensure that the style matches the desired effect); personalizing the new generated item 916; and ensuring ethical and responsible use.

The generated item 916 is new content, and it does not refer to content that is the result of editing or changing existing material (e.g., editing an image to include text within is not considered GAI-generated new content). One difference between the generated item 916 and material created with editing tools is that the newly generated item 916 is entirely new content, while the editing tool modifies existing content or creates the content one instruction at a time. Another difference is that the GAI model 912 can produce highly creative and imaginative content, while editing tools focus on enhancing the existing content based on user commands. Another difference is that the GAI model 912 can generate content rapidly, while the editing tools require more time and effort for thorough editing and refinement.

Figure 10:
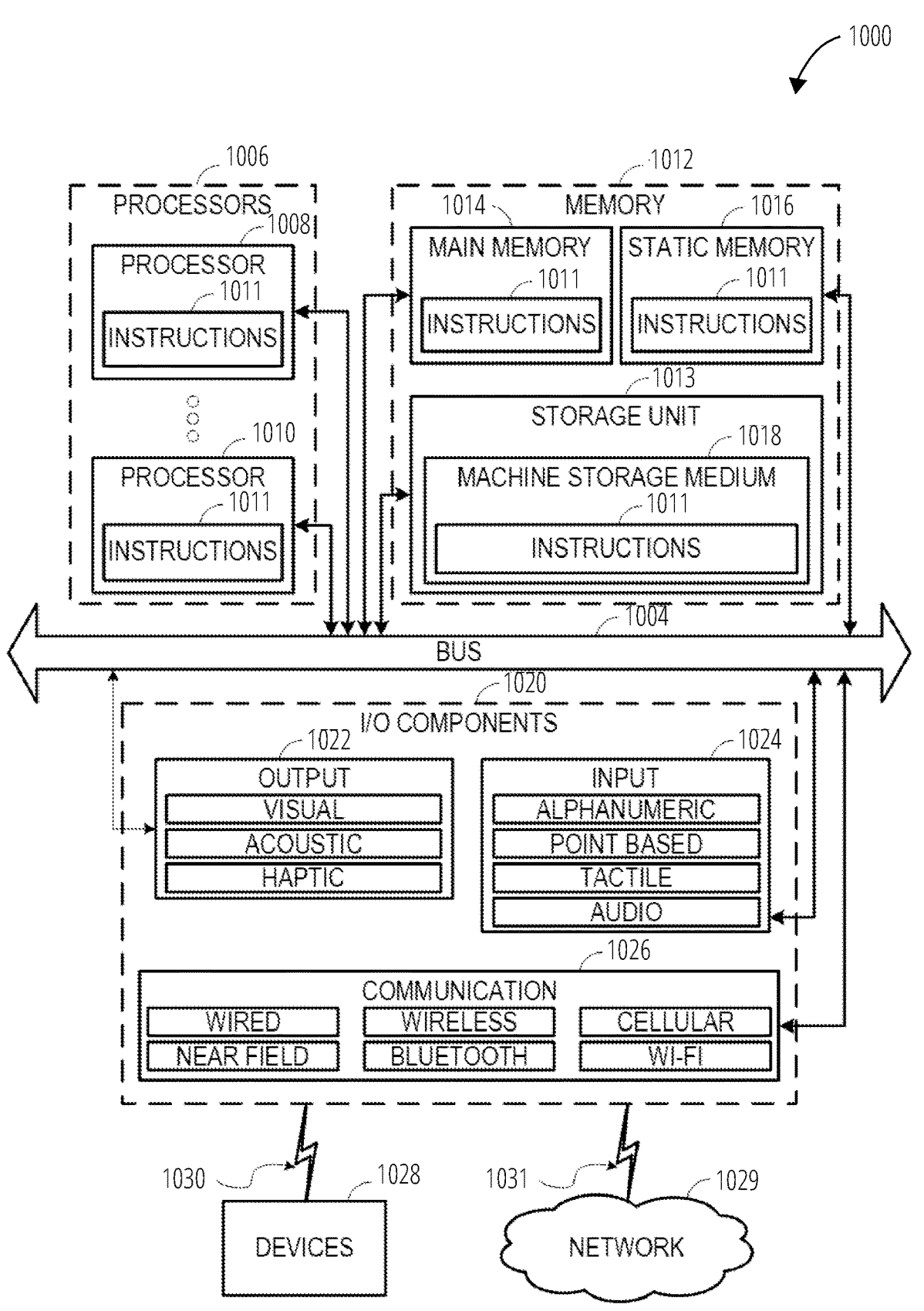
FIG. 10 is an example diagrammatic representation illustrating a machine in the form of a computer system within which a set of instructions may be executed for causing the machine to perform any one or more of the methodologies discussed herein, according to some example embodiments.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1011 (e.g., software, a program, an application, an applet, an app, or other executable code), for causing the machine 1000 to perform any one or more of the methodologies discussed herein, may be executed. For example, the instructions 1011 may cause the machine 1000 to implement portions of the data flows described herein. In this way, the instructions

1011 transform a general, non-programmed machine into a particular machine 1000 (e.g., the user device 104 of FIG. 1, the controller 102 of FIG. 1, the user device 332 of FIG. 3) that is specially configured to carry out any one of the described and illustrated functions in the manner described herein.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1011, sequentially or otherwise, that specify actions to be taken by the machine 1000. Further, while only a single machine 1000 is illustrated, the term "machine" shall also be taken to include a collection of machines 1000 that individually or jointly execute the instructions 1011 to perform any one or more of the methodologies discussed herein.

The machine 1000 includes processors 1006, memory 1012, and input/output (I/O) I/O components 1020 configured to communicate with each other such as via a bus 1004. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), tensor processing unit (TPU), a radio-frequency integrated circuit (RFIC), another processor, or any suitable combination thereof) may include, for example, a processor 1008 and a processor 1010 that may execute the instructions 1011. The term "processor" is intended to include multi-core processors 1006 that may comprise two or more independent processors (sometimes referred to as "cores") that may execute instructions 1011 contemporaneously. Although FIG. 10 shows multiple processors 1006, the machine 1000 may include a single processor with a single core, a single processor with multiple cores (e.g., a multi-core processor), multiple processors with a single core, multiple processors with multiple cores, or any combination thereof.

The memory 1012 may include a main memory 1014, a static memory 1016, and a storage unit 1013, all accessible to the processors 1006 such as via the bus 1004. The main memory 1014, the static memory 1016, and the storage unit 1013 comprise a machine storage medium 1018 that may store the instructions 1011 embodying any one or more of the methodologies or functions described herein. The instructions 1011 may also reside, completely or partially, within the main memory 1014, within the static memory 1016, within the storage unit 1013, within at least one of the processors 1006 (e.g., within the processor's cache memory), or any suitable combination thereof, during execution thereof by the machine 1000.

The I/O components 1020 include components to receive input, provide output, produce output, transmit information, exchange information, capture measurements, and so on. The specific I/O components 1020 that are included in a particular machine 1000 will depend on the type of machine. For example, portable machines, such as mobile phones, will likely include a touch input device or other such input mechanisms, while a headless server machine will likely not include such a touch input device. It will be appreciated that the I/O components 1020 may include many other components that are not shown in FIG. 10. The I/O components 1020 are grouped according to functionality merely for simplifying the following discussion and the grouping is in no way limiting. In various example embodiments, the I/O components 1020 may include output components 1022 and input components 1024. The output components 1022 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1024 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1020 may include communication components 1026 operable to couple the machine 1000 to a network 1029 via a coupler 1031 or to devices 1028 via a coupling 1030. For example, the communication components 1026 may include a network interface component or another suitable device to interface with the network 1029. In further examples, the communication components 1026 may include wired communication components, wireless communication components, cellular communication components, and other communication components to provide communication via other modalities. The devices 1028 may be another machine or any of a wide variety of peripheral devices (e.g., a peripheral device coupled via a universal serial bus (USB)). For example, as noted above, the machine 1000 may correspond to any one of the user device 104 of FIG. 1, the controller 102 of FIG. 1, the user device 332 of FIG. 3, and may include any other of these systems and devices.

The various memories (e.g., 1012, 1014, 1016, and/or memory of the processor(s) 1006 and/or the storage unit 1013) may store one or more sets of instructions 1011 and data structures (e.g., software), embodying or utilized by any one or more of the methodologies or functions described herein. These instructions 1011, when executed by the processor(s) 1006, cause various operations to implement the disclosed embodiments.

Another general aspect is for a system that includes a memory comprising instructions and one or more computer processors or one or more hardware processors. The instructions, when executed by the one or more computer processors, cause the one or more computer processors to perform operations. In yet another general aspect, a tangible machine-readable storage medium (e.g., a non-transitory storage medium) includes instructions that, when executed by a machine, cause the machine to perform operations.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, (e.g., erasable programmable read-only memory (EPROM), electrically erasable programmable read-only memory (EEPROM), field-programmable gate arrays (FPGAs), and flash memory devices); magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1029 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1029 or a portion of the network 1029 may include a wireless or cellular network, and the coupling 1030 may be a Code Division Multiple Access (CDMA) connection, a Global System for Mobile communications (GSM) connection, or another type of cellular or wireless coupling. In this example, the coupling 1030 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1011 may be transmitted or received over the network 1029 using a transmission medium via a network interface device (e.g., a network interface component included in the communication components 1026) and utilizing any one of a number of well-known transfer protocols (e.g., hypertext transfer protocol (HTTP)). Similarly, the instructions 1011 may be transmitted or received using a transmission medium via the coupling 1030 (e.g., a peer-to-peer coupling) to the devices 1028. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1011 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

In some example embodiments, computer-readable files come in several varieties, including unstructured files, semi-structured files, and structured files. These terms may mean different things to different people. Examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data.

As used herein, examples of unstructured files include image files, video files, PDFs, audio files, and the like; examples of semi-structured files include JavaScript Object Notation (JSON) files, extensible Markup Language (XML) files, and the like. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:
1. A system comprising:
one or more hardware processors of a machine; and
at least one memory storing instructions that, when executed by the one or more hardware processors, cause the system to perform operations comprising:

receiving a search query;

retrieving, by at least one hardware processor, a plurality of search result documents based on the search query;

generating a summary of each of the plurality of search result documents using distinct per-document summarization machine learning models, the distinct per-document summarization machine learning models being fine-tuned using one or more summarization-specific datasets to perform both extractive summarization and using labels generated by comprehensive models that are larger than the distinct per-document summarization machine learning models;

synthesizing the generated summary of each of the plurality of search result documents into a single-consolidated answer responsive to the received search query, the synthesizing comprising performing cross-document attributed summarization of the generated summary of each of the plurality of search result documents while maintaining explicit linkages to source materials and while recognizing and excluding duplicative content from the generated summary of each of the plurality of search result documents, the performing cross-document attributed summarization of the generated summary of each of the plurality of search result documents comprising:

selecting a representative sentence from the generated summary of each of the plurality of search result documents for each common particular content identified across the plurality of search result documents; and combining multiple selected representative sentences for each of the common particular content into the single-consolidated answer response using a unified generative artificial intelligence component that synthesizes information from disparate sources while preserving original context;

formatting the single-consolidated answer to include citations to the plurality of search result documents; and presenting, in an interactive interface, the single-consolidated answer without requiring navigation to the plurality of search result documents.

2. The system of claim 1, the operations comprising:

identifying a set of documents from the plurality of search result documents pertinent to a subject of the search query;

employing an additional machine learning model to discern particular content within the identified set of documents; and identifying common particular content across the plurality of search result documents.

3. The system of claim 1, wherein summarization of multiple documents is performed using a hierarchical approach, first summarizing individual sections within each document and second summarizing collective sections to form the single-consolidated answer.

4. The system of claim 1, the operations comprising:

identifying, in an automatic manner, a citation for source documents for extracted information; and embedding a hyperlink to the citation within the single-consolidated answer at a location corresponding to the extracted information.

5. The system of claim 1, the operations comprising:

performing real-time updates to the search query based on detection of new information relevant to the search query, wherein the real-time updates are incorporated into the single-consolidated answer without user intervention.

6. The system of claim 1, the operations comprising:

supporting multi-turn disambiguation by presenting a set of follow-up questions to a user based on the single-consolidated answer;

receiving user responses to the set of follow-up questions; and refining the single-consolidated answer based on the user responses to the set of follow-up questions.

7. The system of claim 1, the operations comprising:

presenting, via a web browser on a user device, the single-consolidated answer; and receiving user input for query refinement, wherein the single-consolidated answer is dynamically updated based on the user input for the query refinement.

8. The system of claim 1, the operations comprising:

using one or more asymmetric compression techniques that reduce computational resources used by the distinct per-document summarization machine learning models and that enable the distinct per-document summarization machine learning models to handle concurrent user queries.

9. A method comprising:

receiving a search query;

retrieving, by at least one hardware processor, a plurality of search result documents based on the search query;

generating a summary of each of the plurality of search result documents using distinct per-document summarization machine learning models, the distinct per-document summarization machine learning models being fine-tuned using one or more summarization-specific datasets to perform both extractive summarization and using labels generated by comprehensive models that are larger than the distinct per-document summarization machine learning models;

synthesizing the generated summary of each of the plurality of search result documents into a single-consolidated answer responsive to the received search query, the synthesizing comprising performing cross-document attributed summarization of the generated summary of each of the plurality of search result documents while maintaining explicit linkages to source materials and while recognizing and excluding duplicative content from the generated summary of each of the plurality of search result documents, the performing cross-document attributed summarization of the generated summary of each of the plurality of search result documents comprising:

selecting a representative sentence from the generated summary of each of the plurality of search result documents for each common particular content identified across the plurality of search result documents; and combining multiple selected representative sentences for each of the common particular content into the single-consolidated answer response using a unified generative artificial intelligence component that synthesizes information from disparate sources while preserving original context;

formatting the single-consolidated answer to include citations to the plurality of search result documents; and presenting, in an interactive interface, the single-consolidated answer without requiring navigation to the plurality of search result documents.

10. The method of claim 9, further comprising:

identifying a set of documents from the plurality of search result documents pertinent to a subject of the search query;

employing an additional machine learning model to discern particular content within the identified set of documents; and identifying common particular content across the plurality of search result documents.

11. The method of claim 9, wherein summarization of multiple documents is performed using a hierarchical approach, first summarizing individual sections within each document and second summarizing collective sections to form the single-consolidated answer.

12. The method of claim 9, further comprising:

identifying, in an automatic manner, a citation for source documents for extracted information; and embedding a hyperlink to the citation within the single-consolidated answer at a location corresponding to the extracted information.

13. The method of claim 9, further comprising:

performing real-time updates to the search query based on detection of new information relevant to the search query, wherein the real-time updates are incorporated into the single-consolidated answer without user intervention.

14. The method of claim 9, further comprising:

supporting multi-turn disambiguation by presenting a set of follow-up questions to a user based on the single-consolidated answer;

receiving user responses to the set of follow-up questions; and refining the single-consolidated answer based on the user responses to the set of follow-up questions.

15. The method of claim 9, further comprising:

presenting, via a web browser on a user device, the single-consolidated answer; and receiving user input for query refinement, wherein the single-consolidated answer is dynamically updated based on the user input for the query refinement.

16. The method of claim 9, further comprising:

using one or more asymmetric compression techniques that reduce computational resources used by the distinct per-document summarization machine learning models and that enable the distinct per-document summarization machine learning models to handle concurrent user queries.

17. One or more machine-storage media embodying instructions that, when executed by a machine, cause the machine to perform operations comprising:

receiving a search query;

retrieving, by at least one hardware processor, a plurality of search result documents based on the search query;

generating a summary of each of the plurality of search result documents using distinct per-document summarization machine learning models, the distinct per-document summarization machine learning models being fine-tuned using one or more summarization-specific datasets to perform both extractive summarization and using labels generated by comprehensive models that are larger than the distinct per-document summarization machine learning models;

synthesizing the generated summary of each of the plurality of search result documents into a single-consolidated answer responsive to the received search query, the synthesizing comprising performing cross-document attributed summarization of the generated summary of each of the plurality of search result documents while maintaining explicit linkages to source materials and while recognizing and excluding duplicative content from the generated summary of each of the plurality of search result documents, the performing cross-document attributed summarization of the generated summary of each of the plurality of search result documents comprising:

selecting a representative sentence from the generated summary of each of the plurality of search result documents for each common particular content identified across the plurality of search result documents; and combining multiple selected representative sentences for each of the common particular content into the single-consolidated answer response using a unified generative artificial intelligence component that synthesizes information from disparate sources while preserving original context;

formatting the single-consolidated answer to include citations to the plurality of search result documents; and presenting, in an interactive interface, the single-consolidated answer without requiring navigation to the plurality of search result documents.

18. The one or more machine-storage media of claim 17, wherein the operations comprise:

identifying a set of documents from the plurality of search result documents pertinent to a subject of the search query;

employing an additional machine learning model to discern particular content within the identified set of documents; and identifying common particular content across the plurality of search result documents.

19. The one or more machine-storage media of claim 17, wherein summarization of multiple documents is performed using a hierarchical approach, first summarizing individual sections within each document and second summarizing collective sections to form the single-consolidated answer.

20. The one or more machine-storage media of claim 17, wherein the operations comprise:

identifying, in an automatic manner, a citation for source documents for extracted information; and embedding a hyperlink to the citation within the single-consolidated answer at a location corresponding to the extracted information.

21. The one or more machine-storage media of claim 17, wherein the operations comprise:

performing real-time updates to the search query based on detection of new information relevant to the search query, wherein the real-time updates are incorporated into the single-consolidated answer without user intervention.

22. The one or more machine-storage media of claim 17, wherein the operations comprise:

supporting multi-turn disambiguation by presenting a set of follow-up questions to a user based on the single-consolidated answer;

receiving user responses to the set of follow-up questions; and refining the single-consolidated answer based on the user responses to the set of follow-up questions.

23. The one or more machine-storage media of claim 17, wherein the operations comprise:

presenting, via a web browser on a user device, the single-consolidated answer; and receiving user input for query refinement, wherein the single-consolidated answer is dynamically updated based on the user input for the query refinement.

24. The one or more machine-storage media of claim 17, wherein the operations comprise:

using one or more asymmetric compression techniques that reduce computational resources used by the distinct per-document summarization machine learning models and that enable the distinct per-document summarization machine learning models to handle concurrent user queries.

\* \* \* \* \*